United States Patent [19]

Tsuchiya

[11] Patent Number: 5,862,012
[45] Date of Patent: Jan. 19, 1999

[54] CONVEYING SYSTEM FOR RECORDING MEDIA HAVING REDUCED FORCE ON THE RECORDING MEDIUM

[75] Inventor: Tatsuhiko Tsuchiya, Iwaki, Japan

[73] Assignee: Alpine Electronics, Inc., Tokyo, Japan

[21] Appl. No.: 649,406

[22] Filed: May 17, 1996

[30] Foreign Application Priority Data

May 26, 1995 [JP] Japan ...................................... 7-127681

[51] Int. Cl.⁶ .................................................. G11B 17/04
[52] U.S. Cl. ...................... 360/99.02; 369/772; 369/178; 360/99.06
[58] Field of Search ............................ 369/36, 75.2, 77.1, 369/77.2; 360/99.02, 98.04, 99.03, 99.06, 99.07; 414/277, 278, 280, 751

[56] References Cited

U.S. PATENT DOCUMENTS

| | | | |
|---|---|---|---|
| 4,608,681 | 8/1986 | Shiosaki ................................. | 369/77.2 |
| 5,084,854 | 1/1992 | Ikedo et al. ............................ | 369/75.1 |
| 5,128,918 | 7/1992 | Suzuki et al. .......................... | 369/77.1 |
| 5,142,523 | 8/1992 | Kamoshita ............................. | 369/77.2 |
| 5,159,585 | 10/1992 | Ikedo et al. ............................ | 369/36 |
| 5,226,028 | 7/1993 | Yamada et al. ........................ | 369/77.1 |
| 5,245,602 | 9/1993 | Ikedo et al. ............................ | 369/75.2 |
| 5,646,926 | 7/1997 | Handa et al. .......................... | 369/77.2 |

*Primary Examiner*—Brian E. Miller
*Attorney, Agent, or Firm*—Brinks Hofer Gilson & Lione

[57] ABSTRACT

A recording medium conveying system equipped with a loading section which receives a recording medium to record or reproduce information on or from the recording medium, and a transferring mechanism which feeds the recording medium toward or from the loading section. The transferring mechanism includes a driven roller, a supporting member located to face the roller and a biasing member for applying either a first biasing force or a second biasing force by which the recording medium is elastically held by the roller and the supporting member biasing force is greater than the first biasing force. Also included in the system is a biasing force adjusting mechanism which selectively applies the first biasing force until the recording medium is inserted between the roller and the supporting member, and which selectively applies the biasing force when the recording medium is inserted therebetween. Due to this adjusting mechanism, the first biasing force is applied when the recording medium is inserted into the gap formed between the roller and the supporting member. Thus, the recording medium is insertable without any resistance. In addition, after the insertion therebetween, the second biasing force is applied, thereby allowing the roller to apply the rotating force such that the recording medium is reliably transferred.

23 Claims, 15 Drawing Sheets

FIG. I

CONVEYING SYSTEM FOR RECORDING MEDIA HAVING REDUCED FORCE ON THE RECORDING MEDIUM

BACKGROUND OF THE INVENTION

1. Field of the Invention

The present invention relates to a recording medium conveying system which serves to transfer such optical recording media as a compact-disk and a mini-disk, such magnetic recording media as a floppy disk, and such storage type recording media as a RAM card to a loading section (recording/reproducing section) and to return them from the loading section.

2. Description of the Prior Art

FIG. 15 is a side elevational view schematically showing a construction of a general recording medium conveying system for selecting recording media 1, and further for loading them in a loading section. The recording media 1 are, for example, a mini-disk acting as a recording medium which is housed in a disk cartridge. The recording media 1 are inserted in an X1 direction from the left-hand side in the illustration into a plurality of receiving areas which are vertically arranged in a housing section 2. At the right-hand side in the illustration there is situated a loading unit 5 including a loading section 3 and a holding member 4 which moves upwardly and downwardly in Y1 and Y2 directions and stops at a position that allows the selection of one of the recording media 1. Between the housing section 2 and the holding member 4 there are placed a transferring roller 6 rotationally driven reversibly (forward and backward) and a supporting roller 7 positioned in opposed relation to the transferring roller 6.

FIG. 15 shows the loading unit 5 selecting the recording medium 1 present in the uppermost receiving area of the housing section 2. The uppermost recording medium 1 is pushed out of the receiving area through a mechanism, not shown, and is interposed between the transferring roller 6 and the supporting roller 7. Subsequently, the recording medium 1 moves in the X1 direction due to the rotating force of the transferring roller 6 and is received within the holding member 4. Then, the holding member 4 moves downward in the Y2 direction to mount the recording medium 1 on the loading section 3. More specifically, the central portion of the mini-disk housed in the cartridge is mounted on a turntable 8 situated on the loading section 3. Further, the mini-disk, together with the turntable 8, is driven rotationally so that the recorded signal is read out through an optical head, not shown.

Upon completion of the read-out from the recording medium 1, the holding member 4 moves in the Y1 direction to separate the recording medium 1 from the loading section 3. Thereafter, the recording medium 1 within the holding member 4 is moved slightly in an X2 direction by means of a mechanism, not shown, such that it is interposed between the transferring roller 6 and the supporting roller 7, and then returned to a vacant receiving area of the housing section 2.

However, the following problems arise when, as shown in FIG. 15, the recording medium 1 is transferred using the transferring roller 6.

1) In order to reliably transfer the recording medium 1 in the X1 or X2 directions between the transferring roller 6 and the supporting roller 7, the transferring roller 6 and the supporting roller 7 need to hold or grasp the recording medium 1 with a strong holding force. An insufficient holding force can cause the transferring roller 6 to slip on the recording medium 1 surface, thereby failing to transfer the recording medium 1 in the X1 and X2 directions. Accordingly, the transferring roller 6 is required to be pressed toward the supporting roller 7 with a strong holding force to some extent by a biasing means such as a spring. However, the aforesaid holding force due to the pressing operation can resist separation of the rollers 6 and 7 such that the recording medium 1 is prevented from being received between the rollers 6 and 7. This resistance increases as the thickness of the recording medium 1 increases. Therefore, when the recording medium 1 is fed or supplied from the station housing 2 between the rollers 6 and 7 by means of a mechanism (not shown), a considerably strong force is needed for feeding the recording medium 1 in the X1 direction, with the result that for transferring the recording medium 1 in the X1 direction it is necessary to use a significant amount of power and a mechanism, such as a lever, having great strength. This also applies to the case where the recording medium 1 held in the holding member 4 is fed between the rollers 6 and 7 by means of another mechanism (not shown). In this case, if the recording medium 1 is forcibly pressed between the rollers 6 and 7 with great power, there is a possibility that the recording medium may be broken.

2) In the example shown in FIG. 15, after the recording medium 1 is fed by the transferring roller 6 and the supporting roller 7 in X1 direction, the recording medium 1 needs to be further drawn into the holding member 4 through a mechanism (not shown). In this case, if the recording medium 1 is pulled into the holding member 4 while being held between the transferring roller 6 and the supporting roller 7, because of the feeding force by the transferring roller 6 in the X1 direction is still applied to the recording medium 1, if there is a difference between the speed at which the recording medium 1 is fed by the transferring roller 6 in the X1 direction and the speed at which it is drawn by the unshown mechanism in the X1 direction, this speed difference causes the application of a large load to the unshown mechanism, which may cause the unshown mechanism to separate from the recording medium 1.

3) The aforesaid problems are not limited to the case where the recording medium 1 is transferred from the housing section 1 to the rollers 6 and 7. These problems also apply to the case where the recording medium 1 is inserted between the rollers 6 and 7 by hand. That is, if the recording medium 1 is manually inserted, the resistance of the rollers 6 and 7 to the insertion of the recording medium 1 is extremely great, thereby producing a sense of incongruity on operation.

4) FIG. 16 is an illustration of the state that a mini-disk or the like, being one example of the recording medium 1, is accommodated within a cartridge 1a. The cartridge 1a has a window formed in its upper surface to allow access to the mini-disk, and includes a shutter Id which freely slides relative to the cartridge 1a in the same direction as the cartridge 1a feeding direction (the X1–X2 directions). When this kind of recording medium 1 is used, a shutter opening mechanism is provided which opens the shutter id prior to loading the recording medium 1 into the loading section 3. Further, during ejection of the recording medium 1 from the loading section 3 after the completion of recording or reproduction, the shutter 1d returns to the original closing condition. When the recording medium shown in FIG. 16 is transferred in the X1 or X2 direction while being held between the transferring roller 6 and the supporting roller 7, the transferring roller 6 strikes against the movable shutter 1d, thereby making it difficult to apply a uniform feeding force from the transferring roller 6 to the recording medium 1 across its entire width, with the result that the recording medium 1 does not move smoothly. In addition, there is a possibility that, when the recording medium 1 is fed by the transferring roller 6, the shutter 1d unintentionally slides in its opening direction due to the rotating force of the transferring roller 6. For instance, if the shutter 1d opens while the recording medium 1 is fed in the X1 direction, the relative positions of the shutter 1d and the shutter opening and closing mechanism, which operates after transfer, can vary, such that closure of the shutter 1d becomes difficult when the recording medium 1 is discharged from the loading section 3.

SUMMARY OF THE INVENTION

The present invention has been developed to eliminate the above-mentioned problems, and it is therefore an object of the present invention to provide a recording medium conveying system which is capable of feeding a recording medium to a transferring means using a rotationally driven roller without applying a great deal of resistance to the recording medium due to the elastic holding (biasing) force of the roller and to reliably transfer the recording medium after insertion into the transferring means.

Another object of this invention is to provide a recording medium conveying system which, in the case where the recording medium is moved within the transferring means by a holding member to a loading section, is capable of reliably drawing the recording medium from the transferring means without application of the transferring force and resistance of the transferring means thereto.

A further object of this invention is to provide a recording medium conveying system where, when a recording medium with a shutter is fed through the transferring means, the shutter does not influence the transferring force and is not affected by the transferring force to open, and further applies the transferring force to portions other than the shutter such that a balanced or uniform force is applied to the recording medium.

In accordance with the present invention, there is provided a recording medium conveying system including a loading section for loading a recording medium such that information may be recorded on the recording medium, or to reproduce information from the recording medium, and transferring means for feeding the recording medium toward the loading section or for taking back the recording medium from the loading section. The transferring means is equipped with a driven roller, a supporting member facing the roller and a biasing member for selectively producing either a first biasing force or a second biasing force on the recording medium whereby the recording medium is selectively held between the roller and supporting member. The transferring means further includes a biasing member adjusting mechanism for applying the first biasing force to the recording medium before the recording medium is moved between the roller and the supporting member, and for applying the first biasing force when the recording medium is received between the roller and the supporting member, wherein the second biasing force is greater than the first biasing force.

Although the transferring means includes the roller and the supporting member, according to an alternative embodiment of the present invention, the supporting member can be constructed with a rotatable supporting shaft (or supporting roller), a non-rotatable supporting shaft or a block body such as a shoe on which the recording medium slides.

The recording medium may be in a disk housed within a cartridge, or can be of a storage type having a non-volatile storage element or the like therein. Further, it can be a disk which is not accommodated in a cartridge. However, this invention is particularly effective to the cartridge-housed type recording medium because the resistance developed during insertion between the roller and the supporting member becomes large when the thickness of the medium is large. In the case that the recording medium uses a disk, in the loading section there is provided a rotational driving means for rotating the disk and a head for writing or reading information.

The biasing member adjusting mechanism selectively reduces the elastic holding (biasing) force holding the recording medium between the roller and the supporting member of the transferring means, and, for example, it can be constructed to change between the first biasing force and the second biasing force applied by the biasing member to the roller or the supporting member. Further, it may also be of the type separating the roller from the supporting member or separating the supporting member from the roller as illustrated in an embodiment disclosed herein.

Furthermore, in the case that the transferring means is located between the loading section and the housing section for storing the recording media, and feeding means is provided to feed the recording medium from the housing section to the transferring means, the actions of the feeding means and the adjusting mechanism may be synchronized so that the biasing force by the roller and the supporting member occurs after the recording medium is fed between the roller and the supporting member through the feeding means.

The housing section accepts one recording medium or a plurality of recording media arranged successively. In the type of housing section accepting a plurality of recording media, the transferring means moves and stops at a position to allow the selection of each recording medium, and subsequently transfers the selected recording medium from the housing section.

In addition, as described in an embodiment, a holding member is provided which holds the recording medium transferred to the loading section and moves it up to a position at which the roller and the supporting member hold the recording medium. In this case, the actions of the holding member and the biasing member adjusting mechanism are synchronized with each other so that the biasing force by the roller and the supporting member increases from the first biasing force to the second biasing force after the recording medium held by the holding member is between the roller and the supporting member.

For establishing the synchronizing relationship between the feeding means and the biasing member adjusting mechanism, or for setting up the synchronizing relationship between the holding member and the biasing member adjusting mechanism, it is preferable that a driving member, which reciprocates by a drive source such as a motor, is provided to move the feeding means or the holding member, and, further, that the elastic biasing force varies by means of a cam section placed on the driving member.

In addition, in accordance with the present invention, there is provided a recording medium conveying system comprising transferring means for feeding a recording medium, a loading section for loading the recording medium to record information on the recording medium or to reproduce information from the recording medium, and a holding member for holding the recording medium fed by the transferring means to transfer the recording medium to the loading section. The transferring means is equipped with a driven roller, a supporting member facing the roller and a biasing member for selectively producing the first and second forces whereby the recording medium is elastically held between the roller and supporting member, and further comprising an adjusting mechanism for adjusting the biasing member to produce the second biasing force until the recording medium held between the roller and the supporting member is fed into the holding member, and for lowering (i.e., adjusting from the second biasing force to the first biasing force) or terminating the elastic holding force when the holding member moves toward the loading section and the recording medium is drawn from between the roller and the supporting member.

In this invention, at least one of the roller and the supporting member can be rotatably supported and to separate from the other, while being biased by the biasing member to approach the other, as well as being moved by the biasing member adjusting mechanism to decrease or terminate the holding force.

Furthermore, in this invention, in the case that the recording medium is made such that a disk is housed in a cartridge and a shutter is provided to expose the disk in the cartridge, it is preferable that the roller is constructed to have a short dimension in its axis directions so as to come into contact with only the cartridge surface (that is, not into contact with the shutter). Further, it is preferable that the point of application of the elastic biasing force by the biasing member for pressing the roller against the recording medium is substantially applied at the center of the roller in its axial direction. It is also preferable that the roller is made to have a short dimension in its axial direction such that it contacts only with the cartridge surface other than the shutter, and has a large diameter portion and a taper section whose diameter gradually decreases from the large diameter portion along the axial direction, and the point of application of the elastic force of the biasing member for pressing it against the recording medium lies at the large diameter portion.

Moreover, in the case that the elastic biasing force by the roller and the supporting member is applied when the recording medium is held between the roller and the supporting member, a detection means is provided to detect that the recording medium is interposed between the roller and the supporting member, and the biasing member adjusting mechanism operates on the basis of the detection output of the detection means so that the roller and supporting member elastically holds the recording medium.

In this invention, owing to the biasing member adjusting mechanism, the elastic biasing force by the roller and the supporting member lowers or terminates (the recording medium is released from the holding force) when the recording medium enters the transferring means so that the recording medium can be easily inserted between the roller and the supporting member. After the recording medium is located between the roller and the supporting member, in response to the adjustment of the biasing member by the biasing member adjusting mechanism, the roller and the supporting member hold the recording medium with a sufficient elastic force, thus reliably feeding the recording medium by means of the rotating power of the roller. At this time, the feeding direction is the direction that the recording medium moves to the loading section or is the direction that the recording medium is ejected from the loading section.

The recording medium can be of the type manually inserted into between the roller and the supporting member. In this case, owing to the elastic biasing member adjusting mechanism, the holding pressure by the roller and the supporting member lowers or terminates at the time of insertion of the recording medium into the transferring means, thereby making it possible to easily insert the recording medium into the transferring means. When the detection means senses the fact that the recording medium enters the transferring means, the biasing member adjusting mechanism increases the holding force produced between the roller and the supporting member so that the recording medium can reliably be held between the roller and the supporting member, and then transferred toward the loading section by means of the rotating force of the roller.

Furthermore, in the case that the housing section is constructed to accept one or a plurality of recording media, the recording medium placed in the housing section is fed through the feeding means into the transferring means. At this time, since the elastic holding force by the roller and the supporting member lowers or terminates until the recording medium is between the roller and the supporting member, the recording medium can be reliably inserted into the transferring means with a light feeding force due to the feeding means. Therefore, as illustrated in an embodiment, a recess or caved portion formed in a side section of the cartridge of the recording medium engages with a feeding lever, and the moving force of this feeding lever permits the recording medium to be moved between the roller and the supporting member. This simplifies the feeding mechanism. In response to the recording medium being put between the roller and the supporting member, the roller and the supporting member elastically hold the recording medium and the rotating force of the roller transfers the recording medium toward the loading section.

On the other hand, in the case that the recording medium put in the loading section is held by the holding member and carried up to the transferring means, the elastic biasing pressure by the roller and the supporting member lowers or terminates until the recording medium held by the holding member is located between the roller and the supporting member. Accordingly, the holding member can easily return the recording medium to the transferring means. In response to the insertion of the recording medium into the transferring means, the roller and the supporting member elastically hold the recording medium and the rotating force of the roller transfers the recording medium.

As described above, the recording medium is fed from the housing section between the roller and the supporting member through the feeding means, or the recording medium held by the holding member is put between the roller and the supporting member in accordance with the movement of the holding member. In this case, if the detection means is provided to detect the presence of recording medium between the roller and the supporting member, the actuation of the biasing member adjusting mechanism becomes possible after the confirmation that the recording medium is held between the roller and the supporting member, thus preventing erroneous feeding of the recording medium.

Likewise, this invention is applicable to the system where the recording medium is fed into the holding member through the transferring means and held by the holding member, and subsequently the holding member moves toward the loading section and the recording medium is drawn from the transferring means and loaded in the loading section. In this case, after the recording medium is fed through the transferring means into the holding member, in synchronism with the start of the movement of the holding member toward the loading section, the biasing member adjusting mechanism reduces or terminates the holding force by the roller and the supporting member. Accordingly, the movement of the holding member permits the recording medium to be surely drawn from the transferring means.

For instance, the biasing member adjusting mechanism can be arranged such that the installation length of a leaf spring or a coil spring for elastically pressing the roller against the supporting member varies to continuously or stepwise change the holding pressure by the roller and the supporting member. In an embodiment, the roller is movable away from the supporting member and is biased by the biasing member in the direction toward the supporting member. Further, in the biasing member adjusting mechanism, a switching cam section provided on a driving lever which drives the roller in the direction away from the supporting member, with the result that the elastic holding pressure on the recording medium lowers or disappears. It is also possible that, instead of moving the roller, the supporting member is moved in the direction away from the roller, or that both the roller and supporting member are moved in the directions away from each other.

Moreover, in accordance with an aspect of the invention, in the case where the recording medium has the cartridge equipped with the shutter, the axial dimension of the roller is made to be shorter than a width of the cartridge. The roller is also positioned such that the roller contacts the cartridge surface portions other than the shutter. In this case, if the elastic pressing force due to the biasing member is applied to the approximate center position of the roller, the roller can accurately give a feeding force to the recording medium. Further, if the roller has a large diameter portion and a taper portion whose diameter gradually decreases from the large diameter portion, and the large diameter portion is arranged to receive the elastic force, the large diameter portion which comes into contact with the recording medium surely applies the feeding force to the recording medium and prevents the recording medium from receiving a rotating force or the like with respect to the feeding direction. In addition, if the biasing member biases only the large diameter portion, an stable feeding force can be given thereto, thus reducing the number of the biasing members to a minimum. Still further, if the large diameter portion is formed at the axial center portion of the roller with the short dimension and the elastic biasing force is applied to that axial center portion of the roller, the application of the transferring force from the roller center portion to the recording medium reliably occurs. Moreover, since the roller does not contact the shutter, the feeding force does not become irregular due to the presence of the shutter and mistaken opening of the shutter does not arise during the transferring of the recording medium.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 1:
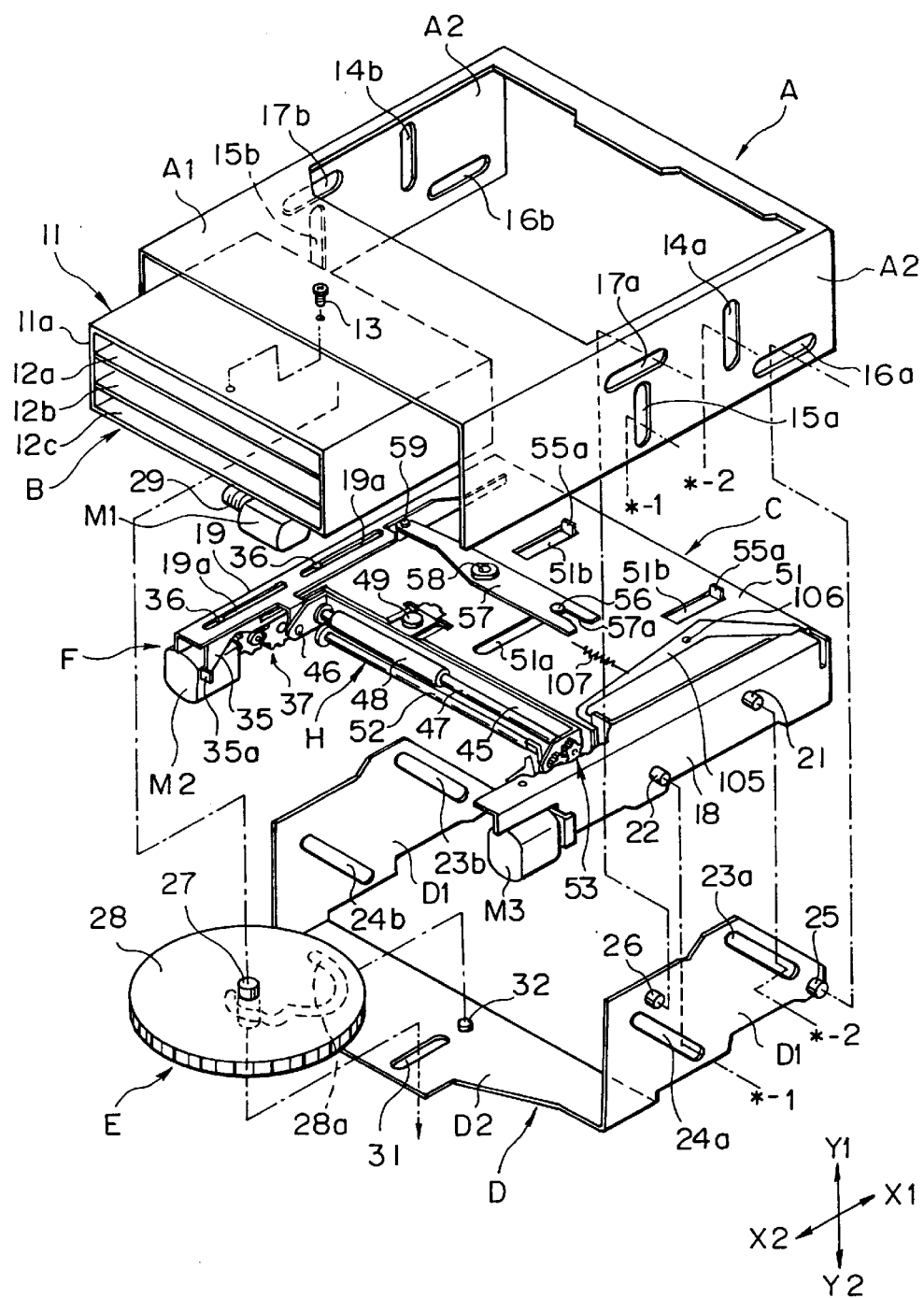
FIG. 1 is an exploded perspective view showing a recording medium drive system to be mounted on a motor vehicle according to an embodiment of the present invention.
Figure 2:
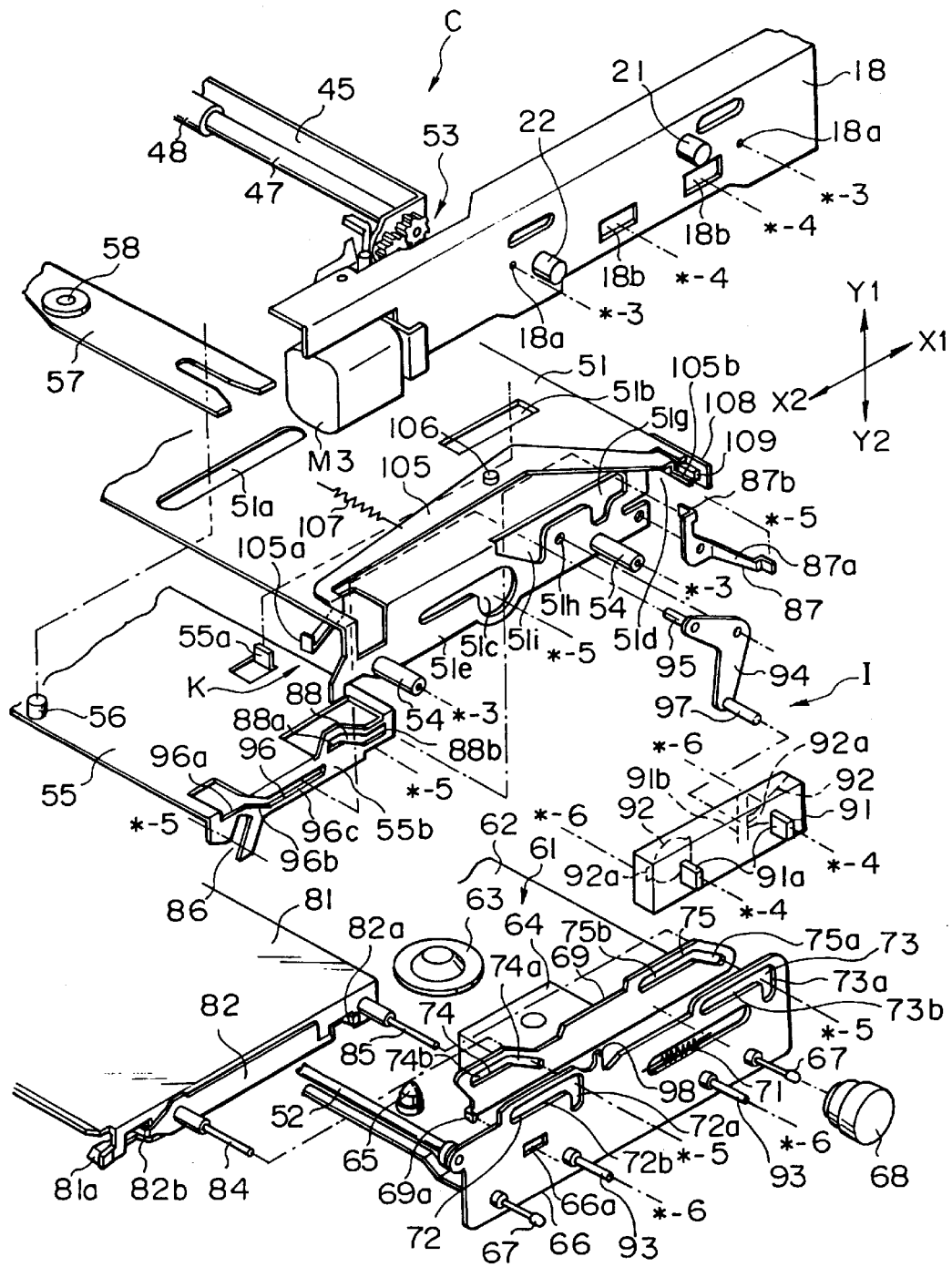
FIG. 2 is an exploded perspective view showing a loading unit structure for use in the recording medium drive system.
Figure 10A:
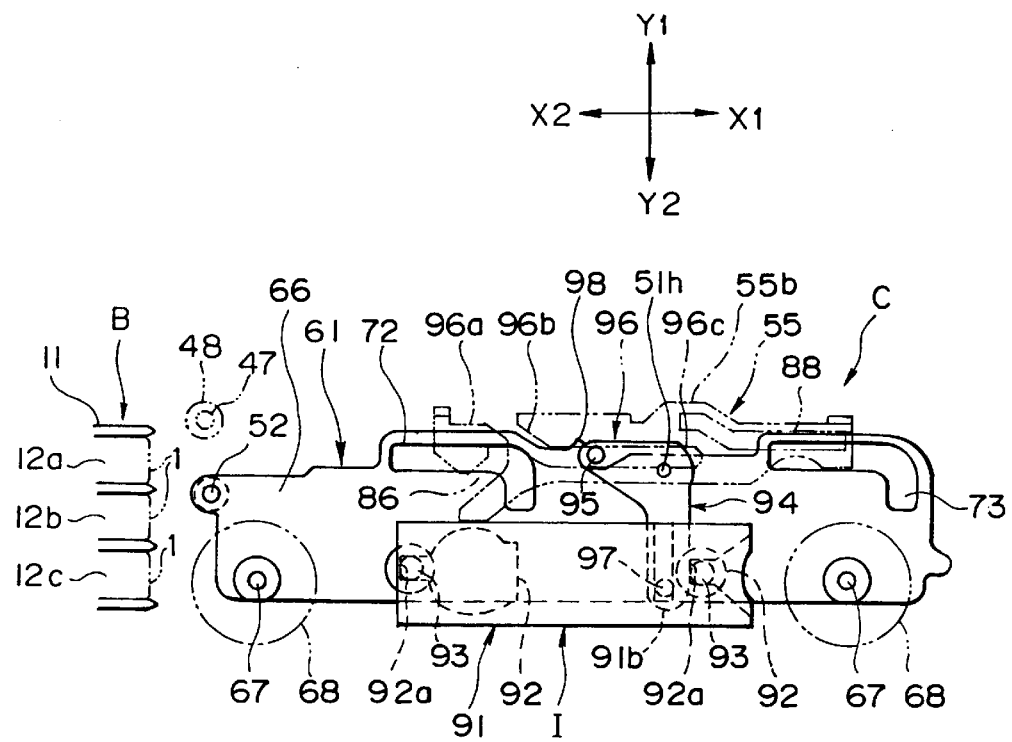
FIGS. 10A and 10B are side elevational views showing a second stage of operation of the loading unit, in which the holding member is lifted to a second position.
Figure 11A:
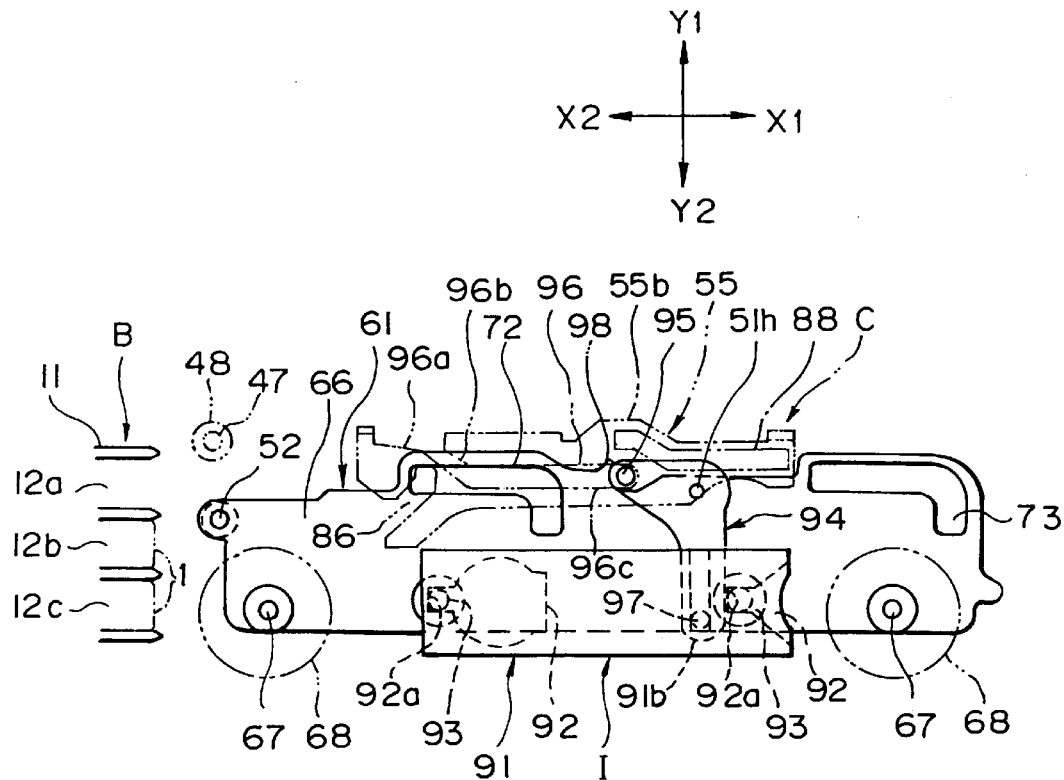
FIGS. 11A and 11B are side elevational views showing a third stage of operation of the loading unit, in which the holding member arrives at a third position close to a housing section.
Figure 11B:
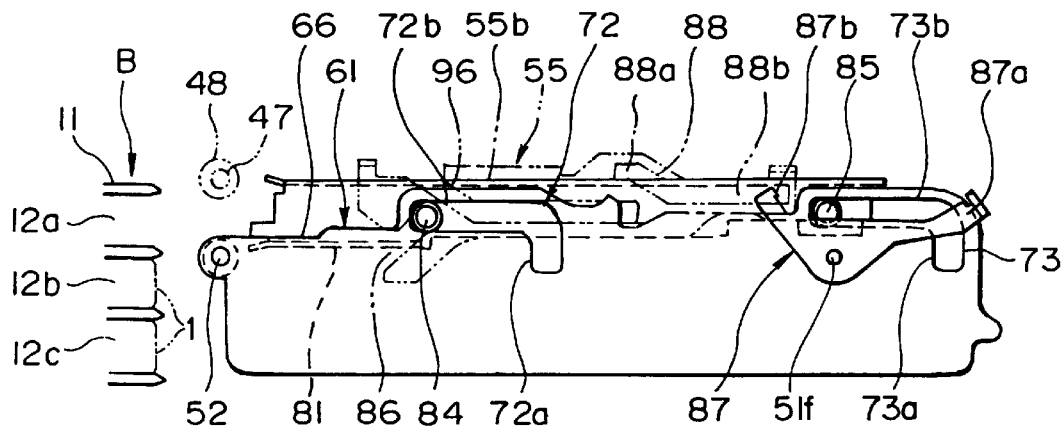
Figure 12A:
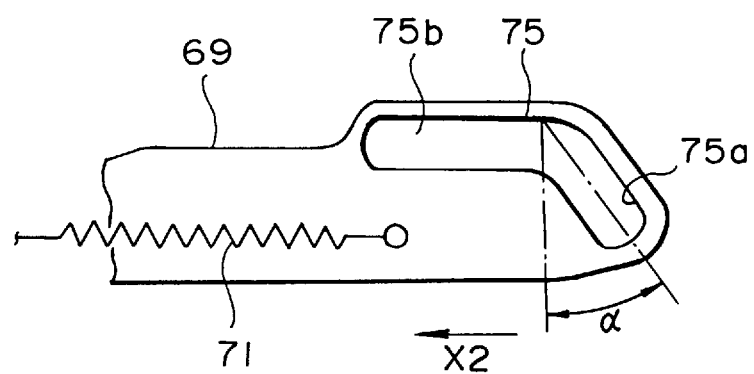
FIG. 12A is a side elevational view showing a biasing plate.
Figure 12B:
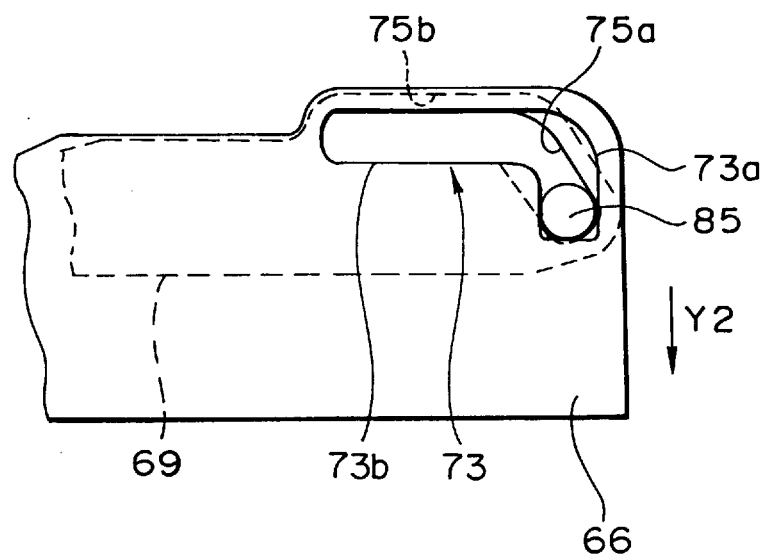
FIG. 12B is a partial side elevational view showing a biasing operation of the biasing plate.

FIG. 1 is an exploded perspective view showing a vehicle-mounted type mini-disk driving apparatus which is one example of a driving apparatus equipped with a recording medium conveying system according to the present invention, FIG. 2 is an exploded perspective view showing a loading unit of the driving apparatus shown in FIG. 1, and FIGS. 3 to 7 are plan views showing loading operations of a recording medium and movements of a holding member in the respective stages of the loading operation. Further, FIGS. 8A to 11B are partial side elevational views provided for describing a lock mechanism of a loading section, a guiding means of the holding member, and operation of a driving means in the loading unit, and FIGS. 12A and 12B are partial side elevational views provided for explaining a biasing operation for transferring the holding member to the loading section at a final stage of operation. Still further, FIG. 13 is an exploded perspective view showing a transferring means H and a biasing member adjusting mechanism J which are the features of the present invention, and FIGS. 14A to 14C are partial side elevational views taken along arrow XIV of FIG. 13, showing the switching action between the elastic biasing pressures.

Referring to FIG. 1, the driving apparatus includes a housing A, a housing section B for storing a plurality of recording media 1, and a loading unit C. The loading unit C is designed to move upwardly and downwardly along Y1, Y2 directions within the housing A in order to select one recording medium 1, and accommodates a loading section 61 and a holding member 81 (see FIG. 2). Further, the driving apparatus includes an elevating member D for lifting and lowering the loading unit C in the Y1 and Y2 directions, and a rotating body E for shifting the elevating member D in X1 and X2 directions.

Figure 3:
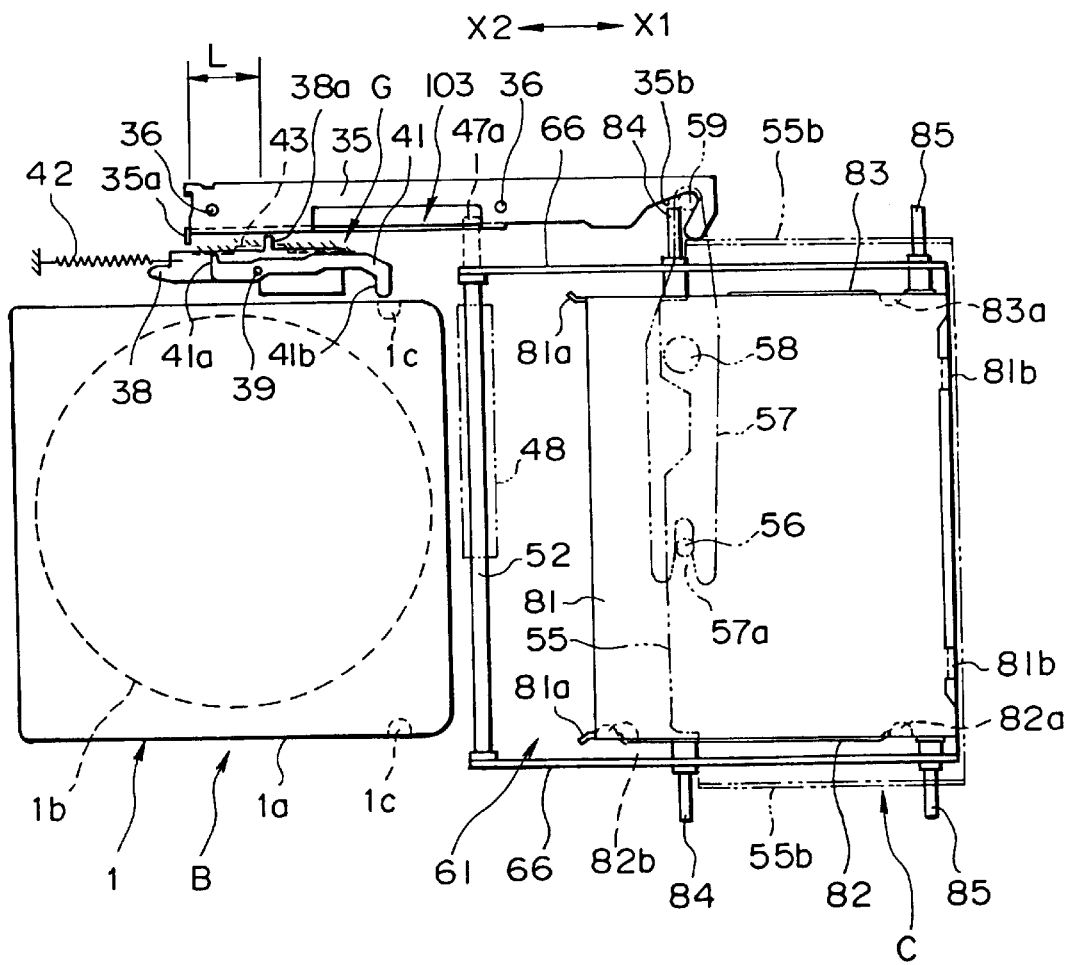
FIG. 3 is a plan view showing the drive system prior to a loading operation of a recording medium from a housing section into a loading section.
Figure 13:
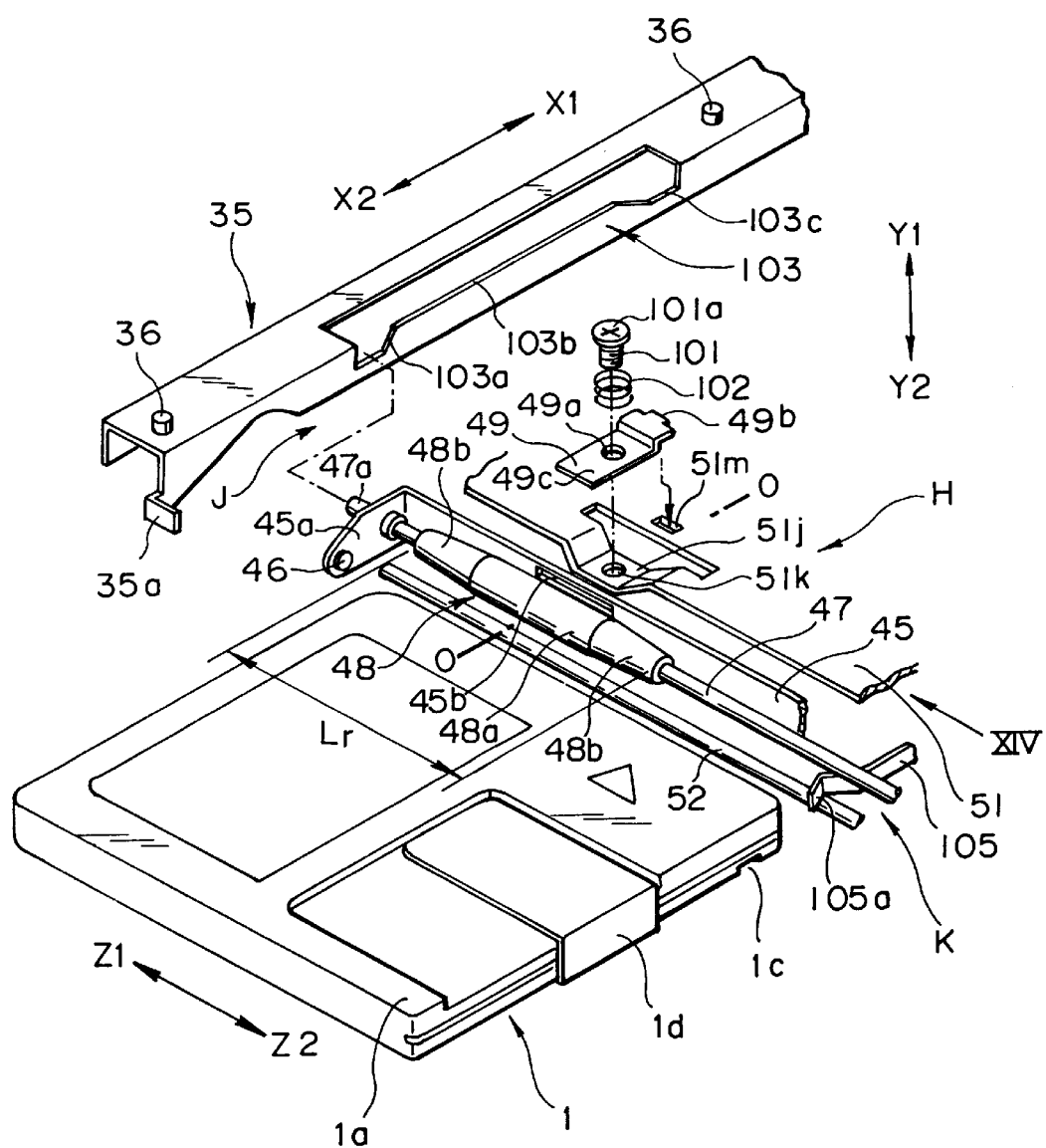
FIG. 13 is an exploded perspective view showing constructions of a transferring means and a biasing member adjusting mechanism.
Figure 14A:
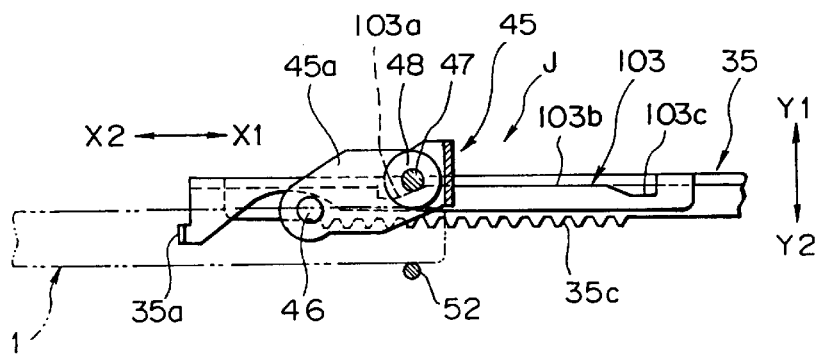
FIGS. 14A, 14B and 14C are illustrations of a switching operation of elastic biasing pressures, and are partial side elevational views taken along arrow XIV of FIG. 13.
Figure 14B:
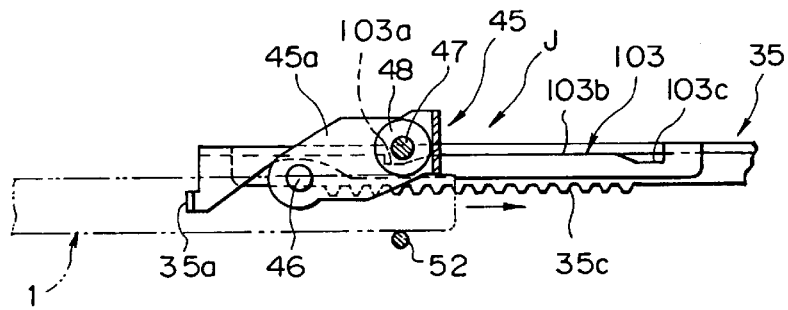
Figure 14C:
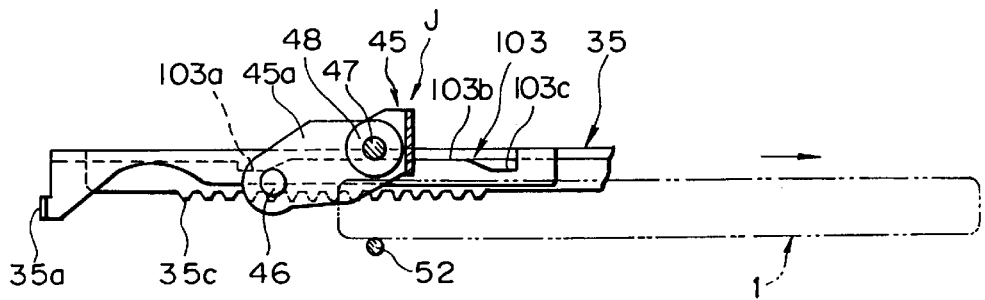
Figure 15:
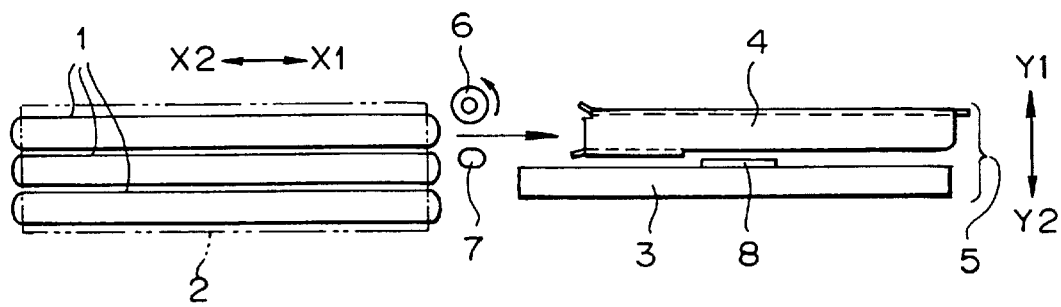
FIG. 15 is a side elevational view showing a general recording medium drive system.
Figure 16:
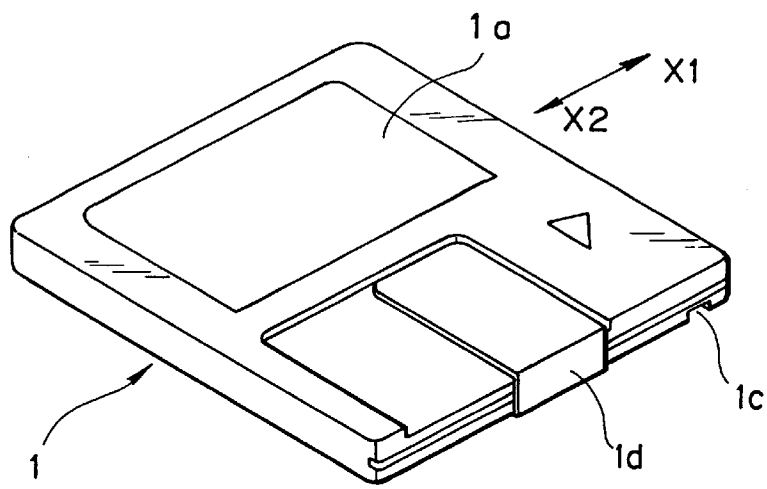
FIG. 16 is a perspective view showing one example of a recording medium.

The recording medium 1 for use with the driving apparatus of the present invention, as shown in the plan view of FIG. 3 and in the perspective views of FIGS. 13 and 16, is made up of a cartridge 1a and an optical magnetic recording and reproducing type mini-disk 1b rotatably housed in the cartridge 1a. The cartridge 1a is formed with recess portions 1c, 1c located on both sides near a front end portion (i.e., the end facing the loading unit C in the X1 direction). As shown in FIGS. 13 and 16, the cartridge 1a is also equipped with a shutter 1d located along a right-hand side of the cartridge 1a (when viewed from behind). Although the shutter 1d is shown in a closed condition in FIGS. 13 and 16, when the shutter 1d slides in the X2 direction, a portion of the mini-disk 1b is exposed through a window formed in an upper surface of the cartridge 1a.

The housing section B includes a case 11 vertically divided into three accommodating areas 12a, 12b and 12c. The case 11 is located within a front section of the aforesaid housing A and is fixedly secured thereto by, for example, a screw 13. To a front section of the housing A is attached a nose section (not shown) for aesthetic purposes. In this nose section is formed an opening whose area is substantially equal to an opening area of the resting case 11, so that users may insert recording media through this opening into the accommodating areas 12a, 12b and 12c. In addition, a holding means, such as a leaf spring, is placed within each of the accommodating areas 12a to 12c for temporarily holding the recording medium 1 received therein. Further, formed adjacent a rear section on both sides A1 and A2 of the housing A are elongated holes 14a, 14b, 15a and 15b extending in the Y1 and Y2 directions, and elongated holes 16a, 16b, 17a and 17b extending in the X1 and X2 directions. The loading unit C is equipped with side chassis 18 and 19, with shafts 21 and 22 protruding from the outer surface of the side chassis 18. Although not shown in FIG. 1, similar shafts 21 and 22 extend from the other side chassis 19.

The elevating member D includes side plates D1, D1 extending perpendicularly from a bottom plate D2. Driving holes 23a, 23b, 24a and 24b are formed in side plates D1, D1. In addition, shafts 25 and 26 are fixedly secured onto and extend from the outer surfaces of the side plates D1, D1. In FIG. 1, only the shafts 25 and 26 on the outer surface of one side plate D1 are shown. The shafts 21 on both the side chassis 18 and 19 are slidably inserted into the inclined driving holes 23a and 23b, respectively, and further are slidably inserted into the elongated holes 14a and 14b of the housing A, respectively. Likewise, the shafts 22 engage with (are fitted into) the inclined driving holes 24a and 24b, respectively, and further slidably engage with the elongated holes 15a and 15b of the housing A, respectively. Further, the shafts 25 on the side plates D1, D1 of the elevating member D are slidably inserted into the elongated holes 16a and 16b of the housing A, respectively. Similarly, the other shafts 26 slidably engage with the elongated holes 17a and 17b, respectively.

The elevating member D is guided along the elongated holes 16a, 16b, 17a and 17b, which extend horizontally, such that the elevating member D is movable in the X1 and X2 directions with respect to the housing A. When the elevating member D moves in the X1 direction, a lifting force in the Y1 direction works on the shafts 21 and 22 due to the inclined driving holes 23a, 23b, 24a and 24b so that the loading unit C moves upwardly in the Y1 direction. Conversely, when the elevating member D moves in the X2 direction, the inclined driving holes 23a, 23b, 24a and 24b apply the lowering force to the shafts 21 and 22 so that the loading unit C lowers in the Y2 direction. In accordance with the lifting and lowering movements of the loading unit C in the Y1 and Y2 directions, the loading unit C is positioned to select one of the three recording media situated in the housing section B.

The rotating body E is provided for driving the elevating member D in the X1 and X2 directions as follows. The rotating body E includes a large diameter gear 28 rotatably supported by a rotating shaft 27 onto the lower surface of the resting case 11. Also on the lower surface of the resting case 11 is a selection motor M1 having an output shaft coupled to a worm gear 29, and a reduction gear train (not shown) coupled to the worm gear 29 which is driven to rotationally operate the large diameter gear 28. In addition, a cam channel 28a is formed in the lower surface of the large diameter gear 28. This cam channel 28a is formed such that the distance (radius) from the rotating shaft 27 varies in accordance with the rotation of the large diameter gear 28.

The bottom plate D2 of the elevating member D has an elongated hole 31 formed to extend in the X1 and X2 directions, and a follower shaft 32 is fixedly secured to the upper surface of the bottom plate D2. The rotating shaft 27 of the rotating body E is inserted into the elongated hole 31, and the elevating member D is movable in the X1 and X2 directions relative to the rotating shaft 27. Further, the follower shaft 32 slidably engages with the cam channel 28a.

When the large diameter gear 28 is rotated clockwise (as viewed in FIG. 1) by the selection motor M1, the elevating member D is shifted in the X1 direction by the cam channel 28a, causing the loading unit C to lift in the Y1 direction. On the other hand, when the large diameter gear 28 is rotated counterclockwise, the cam channel 28a drives the elevating member D in the X2 direction so that the loading unit C lowers in the Y2 direction. If a detection device is provided which, for example, senses the angle of rotation of the large diameter gear 28, the moving distance of the elevating member D in the X1 and X2 directions may be determined. This makes it possible to determine the lifted and lowered positions of the loading unit C in the Y1 and Y2 directions. On the basis of this determination, the lifting and lowering distances of the loading unit C is controllable so that the loading unit C stops at a position that allows the selection of one of the recording media 1.

In the loading unit C, a driving lever 35 is provided within the side chassis 19. As shown in FIG. 1, in the side chassis 19 there are formed elongated holes 19a, 19a extending in the X1 and X2 directions. Shafts 36, 36 fixed to the driving lever 35 are inserted slidably into the elongated holes 19a, 19a, respectively, so that the driving lever 35 is supported movably in the X1 and X2 directions. As shown in FIG. 1, a driving motor M2 is provided at the front end of the side chassis 19. Power from the driving motor M2 is transmitted through a reduction gear train 37 to a rack 35c (see FIG. 14) formed on the driving lever 35 so that the driving lever 35 shifts in the X1 and X2 directions in accordance with the forward and backward driving forces of the driving motor M2. In accordance with the invention, a driving means F is composed of the driving motor M2 serving as a power source, the driving lever 35 serving as a driving member, and a driving plate and driving arm 57 (see FIG. 2) also acting as driving members.

An insertion piece 35a, which is bent inwardly, is formed at the front end of the driving lever 35. As shown in FIG. 3, the housing section B includes a feeding mechanism G provided on a left-side plate 11a (see FIG. 1) of the resting case 11. One feeding mechanism G is provided adjacent each of the three-stepped accommodating areas 12a, 12b and 12c. Each feeding means G includes a sliding member 38 which slides in the X1 and X2 directions next to one of the accommodating areas 12a, 12b and 12c of the resting case 11, and is biased or urged in the X2 direction by means of a return spring 42. A feeding lever 41 is movably supported on the sliding member 38 by a shaft 39. This feeding lever 41 is biased clockwise by a spring (not shown) relative to the sliding member 38.

FIG. 3 shows the driving lever 35 in a leftmost position (i.e., shifted in the X2 direction). When the driving lever 35 is shifted from this position in the X1 direction, a protrusion (pressed piece) 38a of the sliding member 38 is pressed by the insertion piece 35a so that the sliding member 38 moves in the X1 direction. The feeding lever 41, which is supported on the sliding member 38, moves with the sliding member 38 in the X1 direction. In accordance with this feeding process, a sliding end 41a of the feeding lever 41 slides on a guide 43. Accordingly, when the feeding lever 41, which is biased in a clockwise direction, moves in the X1 direction, the feeding lever 41 first rotates clockwise in accordance with an irregular configuration of the guide 43, and then rotates counterclockwise. Upon the movement of the driving lever 35 in the X2 direction, the sliding member 38 is returned in the X2 direction by means of the return spring 42. Also in this case, the feeding lever 41 rotates clockwise halfway along its travel.

Figure 4:
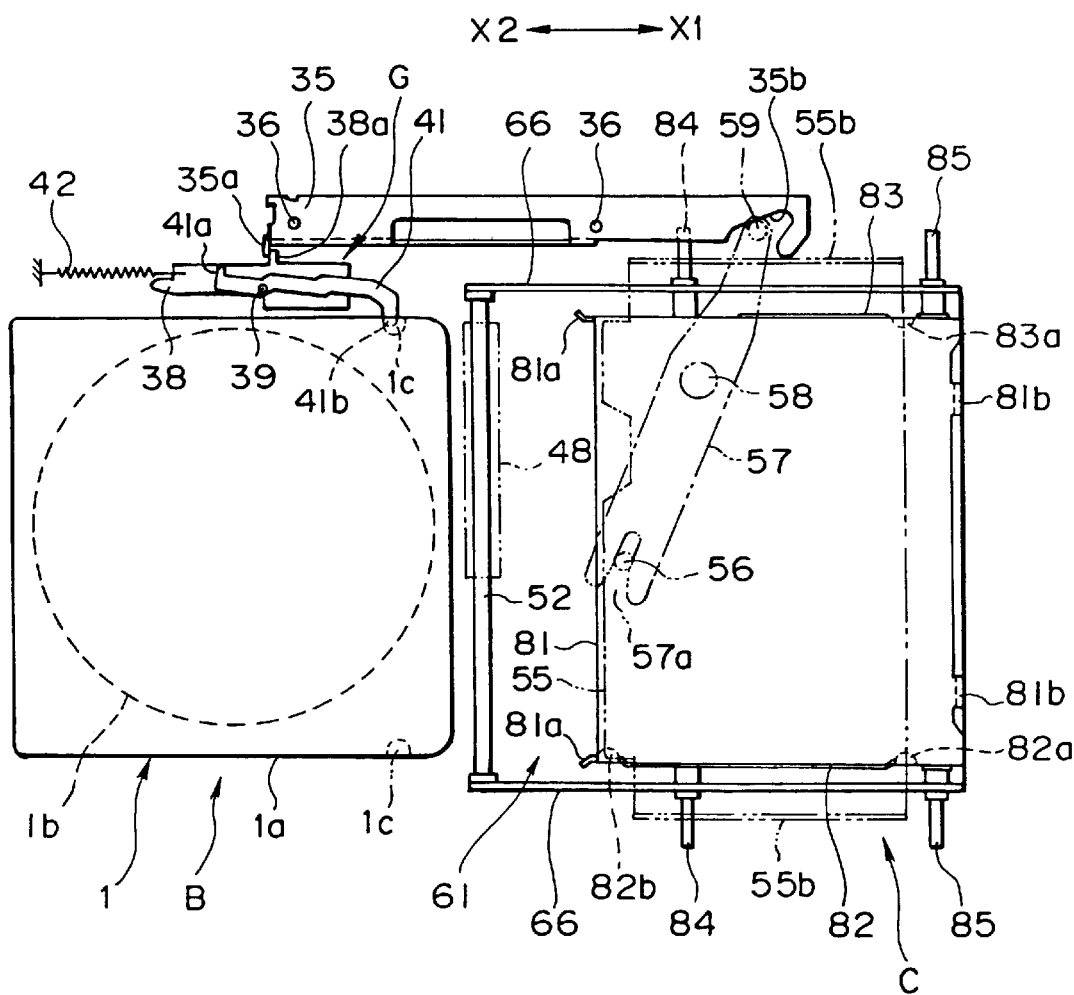
FIG. 4 is a plan view showing a first stage of the loading operation after a holding member is lifted from the loading section.
Figure 5:
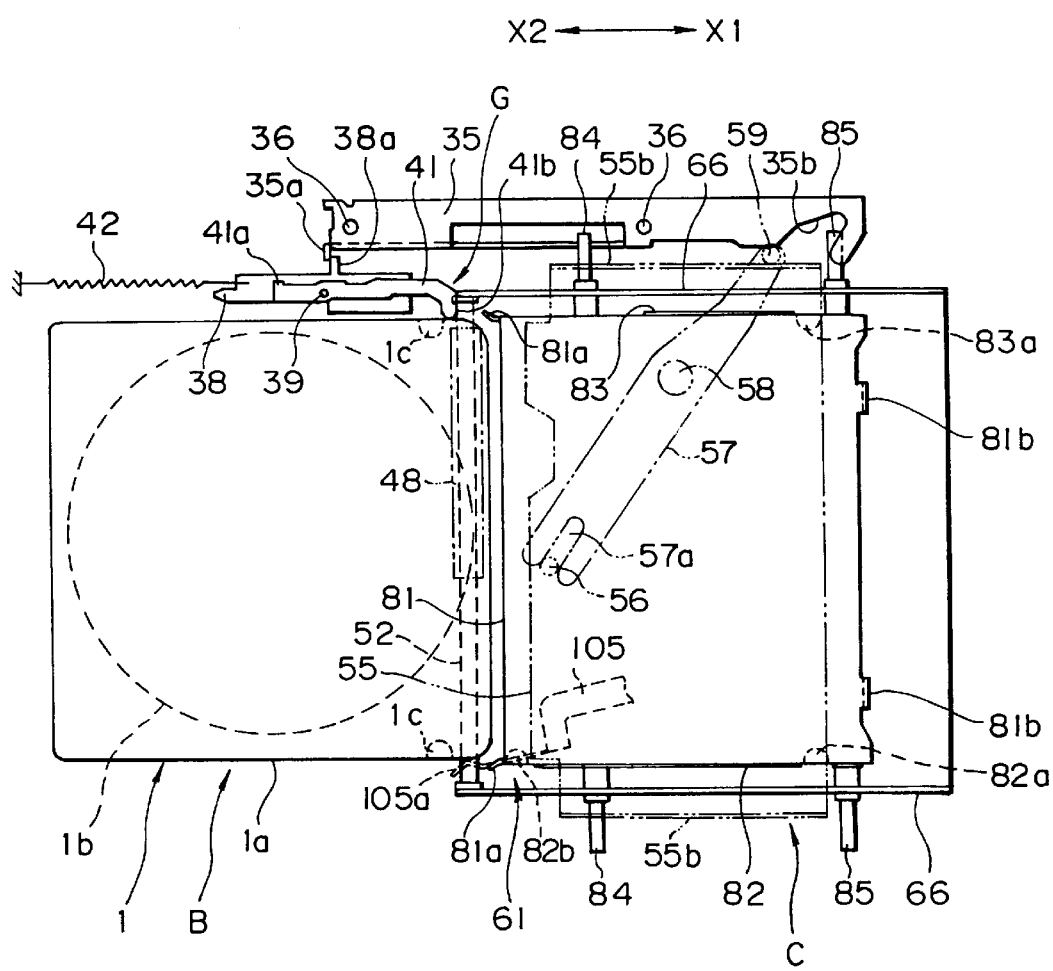
FIG. 5 is a plan view showing a second stage of the loading operation in which the holding member is moved toward the housing section.

Thus, when the driving lever 35 moves in the X1 direction, as shown in FIG. 4 a feeding piece 41b of the feeding lever 41 rotates clockwise to engage with the recess portion 1c of the recording medium 1 so that the recording medium 1 is transferred by the feeding piece 41b in the X1 direction. Thereafter, as shown in FIG. 5, the feeding piece 41b rotates counterclockwise to separate from the recess portion 1c. When the recording medium 1 is returned into the housing section B, the driving lever 35 shifts in the X2 direction and the feeding lever 41 returns to the original position. At this time, the feeding piece 41b of the feeding lever 41 presses a rear (X1 direction) end portion of the recording medium 1 so that the recording medium 1 can surely be returned into the housing section B.

As shown in FIG. 1, in the loading unit C a roller supporting plate 45 serving as a roller supporting member is mounted between the right and left side chassis 18 and 19. Supporting pieces 45a (see FIG. 13), which are formed by bending end portions of the roller supporting plate 45, are supported such that they are slightly rotatable with respect to the side chassis 18 and 19. The supporting pieces 45a of the roller supporting plate 45 rotatably support a roller shaft 47 having a rubber transferring roller 48 fixedly formed thereon. Further, as shown in FIG. 2, side plates 66 of a loading section 61, which is described below, rotatably support a supporting shaft 52 acting as a supporting member. The transferring roller 48 and the supporting shaft 52 are placed in parallel and in an opposed relation to each other, and hold and transfer the recording medium therebetween.

A feeding motor M3 is installed at the front (X2 direction) end portion of the right side chassis 18 of the loading unit C, with its power being transmitted through a reduction gear train 53 and then transmitted to the roller shaft 47 so that the roller shaft 47 and the transferring roller 48 are driven together forwardly and backwardly (reversibly). Due to this rotating power, the recording medium 1 is transferred in the X1 or X2 direction.

As shown in FIG. 13, the axial dimension Lr of the roller shaft 47 is shorter than the width dimension of the recording medium 1. Further, the fixed position of the transferring roller 48 on the roller shaft 47 is shifted toward the left side (Z1 side) as shown in FIG. 13. Accordingly, when the recording medium 1 is held between the transferring roller 48 and the supporting shaft 52 and transferred in the X1 or X2 directions, the transferring roller 48 contacts an area on the surface of the cartridge 1a other than the shutter 1d. That is, the transferring roller 48 does not contact the shutter 1d of the recording medium 1. Further, the transferring roller 48 is constructed to include a cylindrical (bar-like) large central portion 48a having a constant diameter and taper portions 48b, 48b formed at both ends thereof whose diameters gradually decrease (taper) from the large diameter portion 48a (see FIG. 13).

An upper chassis 51 is fixed between the side chassis 18 and 19, and a biasing plate 49 is provided as a biasing member at the front (X2 direction) end portion of the upper chassis 51. As shown in FIG. 13, a fitting hole 49a is formed in the biasing plate 49. The upper chassis 51 is formed with a deformed section 51j which is bent and recessed in the Y2 direction, which deformed section 51j having a female screw hole 51k at its center position. In addition, a supporting slit 51m is formed in the upper chassis 51 on the X1 direction side with respect to the deformed section 51j. The fitting hole 49a of the biasing plate 49 receives a fitting screw 101 which, in turn, engages with the female screw hole 51k. Further, around the fitting screw 101 there is located a biasing spring 102 constructed as a coil spring, which is compressed and interposed between a head portion 101a of the fitting screw 101 and the biasing plate 49 so as to be elastically deformable. More specifically, the fitting screw 102 is not completely revolved up to the full position so that a space remains between the head portion 101a and the biasing plate 49 to accept the compressed biasing spring 102.

At the proximal end portion of the biasing plate 49 there is formed a finger 49b bent downward in the Y2 direction. This finger 49b is loosely inserted into the aforesaid supporting slit 51m, while the front tip portion 49c of the biasing plate 49 is inserted into a biasing slit 45b formed in the roller supporting plate 45. The aforesaid recessed deformed section 51j constitutes a movable area of the biasing plate 49, whereupon the biasing plate 49 is movable slightly within this movable area in the Y1 and Y2 directions in such a manner that the supporting slit 51m acts as a supporting point. The biasing spring 102 applies an elastic biasing force to the biasing plate 49 in the Y2 direction. Due to this elastic force, the biasing plate 49 is pressed to pivot about the supporting portion of the supporting slit 51m in the Y2 direction, with the result that the roller supporting plate 45 is biased by the tip portion 49c of the biasing plate 49 in the Y2 direction.

Because the roller supporting plate 45 is biased in the Y2 direction, when the recording medium 1 is held between the transferring roller 48 and the supporting shaft 52, an elastic biasing pressure is applied to the recording medium 1. Because of a strong elastic holding pressure produced due to the biasing spring 102, the recording medium 1 is held between the transferring roller 48 and the supporting shaft 52 with the strong elastic (second) biasing pressure, and further transferred in the X1 or X2 direction by the rotationally driving force transmitted through the roller shaft 47.

The biasing slit 45b, formed in the roller supporting plate 45, is located at the central position of the axial dimension Lr of the transferring roller 48. Thus, the point of application of the biasing force applied from the biasing plate 49 to the roller supporting plate 45 in the Y2 direction substantially coincides with the center line O—O of the axial dimension Lr of the transferring roller 48. The transferring roller 48 is shifted in the Z1 direction to avoid contact with the shutter 1*d* on the cartridge 1*a* surface of the recording medium 1. For this reason, for instance, when the biasing force works on the center of the entire width of the roller supporting plate 45 in the Y2 direction, or when the uniform biasing force is presented to both side portions of the roller supporting plate 45 in the Y2 direction, because the transferring roller 48 is shifted in the Z1 direction, the roller supporting plate 45 and the roller shaft 47 tend to be inclined in the Y2 direction, with the result that it is difficult to reliably apply the transferring force to the recording medium 1 in the X1 and X2 directions. However, in this embodiment the biasing force of the biasing spring 102 is applied through the biasing plate 49 to the approximate center position of the axial dimension Lr of the transferring roller 48. Accordingly, when the transferring roller 48 comes into contact with the upper surface of the cartridge 1*a* of the recording medium 1, inclination of the roller supporting plate 45 and the roller shaft 47 does not occur, thus ensuring the application of the transferring force to the cartridge 1*a*.

Moreover, the transferring roller 48 has a so-called drumlike configuration where a central position constitutes the large diameter portion 48*a* and the axial side portions are constructed to form the taper portions 48*b*, 48*b*. Therefore, the axial central portion (the large diameter portion 48*a*) of the transferring roller 48 is designed to reliably contact the upper surface of the cartridge 1*a*. Since the biasing force from the biasing plate 49 in the Y2 direction acts on the large diameter portion 48*a* which reliably contacts the upper surface of the cartridge 1*a*, the elastic holding pressure applied by the transferring roller 48 is reliably applied to the upper surface of the cartridge 1*a* in the vicinity of the aforesaid center line O—O. Accordingly, the cartridge 1*a* receives the driving force in the X1 and X2 directions in the vicinity of the center line O—O, and the recording medium 1 reliably receives the transferring force. With the central portion of the transferring roller 48 being constructed as the large diameter portion 48*a*, that portion reliably applies the transferring force to the cartridge 1*a*. On the other hand, since the transferring roller 48 has the drum-like configuration, the roller shaft 47 is likely to incline. However, the biasing force due to the biasing plate 49 is applied to at the approximate center of the large diameter portion 48*a*, and hence the inclination due to the biasing force does not easily occur.

The shape of the transferring roller 48 is not limited to that as shown in FIG. 13, but is also appropriate to have a configuration where its axial dimension is Lr and the central (Z2 direction) portion constitutes the large diameter portion while the left side (Z1 direction) portion is formed as a taper portion. In this case, if the point of application of the biasing force in the Y2 direction is coincident with the center of that large diameter portion, similar effects are obtained. Referring to FIG. 13, the transferring means H comprises the feeding motor M3, the transferring roller 48, the supporting shaft 52, the biasing plate 49, and the biasing spring 102. Further, the elastic biasing pressure adjusting mechanism J is mounted between the driving lever 35 and the end portion 47*a* of the roller shaft 47. The biasing member adjusting mechanism J comprises a switching cam section 103, serving as a holding pressure switching section, which is provided on the driving lever 35. The switching cam section 103 includes a first recessed portion 103*a* formed at the front (Y2 direction) end, a second recessed portion 103*c* formed in the rear (X1 direction) end, and a raised portion 103*b* that extends a predetermined distance in the X1 and X2 directions between the first and second recessed portions 103*a* and 103*c*, and projects in the Y1 direction. In addition, the end portion 47*a* of the roller shaft 47 is inserted into the switching cam section 103.

When the driving lever 35 reaches the end of its travel in the X2 direction, the end portion 47*a* of the roller shaft 47 is located in the second recessed portion 103*c*. On the other hand, when the driving lever 35 reaches the end of its travel in the X1 direction, the end portion 47*a* of the roller shaft 47 is located in the first recessed portion 103*a*. Since the first recessed portion 103*a* is recessed in the Y2 direction, the separation between the supporting shaft 52 and the transferring roller 48, which is biased by the biasing plate 49, becomes shorter than the thickness of the cartridge 1*a* of the recording medium 1. At this time, if the recording medium 1 is positioned between the transferring roller 48 and the supporting shaft 52, due to a (second) biasing force by the biasing plate 49, the transferring roller 48 and the supporting shaft 52 elastically hold the recording medium 1, whereupon the rotating force from the transferring roller 48 is applied as the transferring force to the recording medium 1.

While the driving lever 35 is moving in the X1 or X2 direction, the end portion 47*a* of the roller shaft 47 slides on the raised section 103*b*. At this time, since the roller shaft 47 and the transferring roller 48 are lifted in the Y1 direction, the separation between the transferring roller 48 and the supporting shaft 52 becomes substantially equal to or slightly larger than the thickness of the recording medium 1 due to the (first) biasing force by the biasing plate 49. Accordingly, the elastic biasing pressure applied by the transferring roller 48 and the supporting shaft 52 does not substantially act on the recording medium 1. In this state, the recording medium 1 is easily inserted into or pulled out of the portion between the transferring roller 48 and the supporting shaft 52.

Furthermore, as shown in FIG. 2, on the upper surface of the upper chassis 51 there is provided a detection means K which includes a detection lever 105. The detection lever 105 is supported rotatably by a shaft 106 on the upper surface of the upper chassis 51. Between the detection lever 105 and the upper chassis 51 is a detection spring 107 which biases the detection lever 105 clockwise. A front end portion of the detection lever 105 serves as a detection end 105*a*. This detection end 105*a* is inserted into the upper chassis 51 and, as shown in FIGS. 5 and 13, is positioned between the roller shaft 47 and the supporting shaft 52 at the rightward (Z2 direction) side. The rearward (X1 direction) end portion of the detection lever 105 extends behind the upper chassis 51 to act as a pressing end 105*b*. A printed substrate 108 is supported at the rearward (X1 direction) end portion of the upper chassis 51, and is equipped with a detection switch 109. In addition, the detection switch 109 is operable by the pressing end 105*b*.

When the recording medium 1 is not located between the roller shaft 47 and the supporting shaft 52, the detection lever 105 is rotated clockwise by the detection spring 107, and the pressing end 105*b* separates from the detection switch 109 so that the output of the detection switch 109 becomes OFF. In response to a presence of the recording medium 1 between the roller shaft 47 and the supporting shaft 52, the end portion of the recording medium 1 presses the detection end 105*a* in the Z2 direction, whereupon the detection lever 105 is rotated counterclockwise to cause the pressing end 105*b* to press the detection switch 109, with the result that the output of the detection switch 109 becomes ON.

As described above, when the driving lever 35 moves in the X1 or X2 direction, in the biasing member adjusting mechanism J the switching cam section 103 moves, with the result that the transferring roller 48 exhibits increased or decreased elastic biasing pressure with respect to the recording medium 1. Here, with the provision of the detection lever 105 constituting the detection means K, it is possible to detect whether or not the recording medium 1 is held between the transferring roller 48 and the supporting shaft 52. Accordingly, when the driving lever 35 is in operation, it is possible to confirm whether or not the recording medium 1 is in a held condition, thus preventing its malfunction.

The description of the invention now returns to the loading unit C. As shown in FIG. 2 supporting poles 54, 54 are fixed onto a right side plate 51e of the upper chassis 51. The side chassis 18 has fixing holes 18a, 18a into which the tip portions of the supporting poles 54, 54 are fixedly attached by screws. Likewise, a supporting pole 54 is fixed onto the left side plate of the upper chassis 51 and also fixed onto the side chassis 19. More specifically, in the loading unit C the upper chassis 51 is fixedly secured onto the insides of the side chassis 18 and 19, and, as shown in FIG. 1, the upper surfaces of the both the side chassis 18 and 19 and the upper surface of the upper chassis 51 are substantially in a common plane. A driving plate 55 is fitted onto the lower surface of the upper chassis 51. A sliding piece 55a is integrally constructed on the upper surface near a rear edge of the driving plate 55, and a sliding shaft 56 is fixedly secured onto the upper surface near the front (X2 direction) edge of the driving plate 55. The sliding shaft 56 is inserted into an elongated hole 51a formed in the upper chassis 51 and the sliding piece 55a is inserted into an elongated hole 51b, whereupon the driving plate 55 is supported slidably in the X1 and X2 directions with respect to the upper chassis 51.

Figure 6:
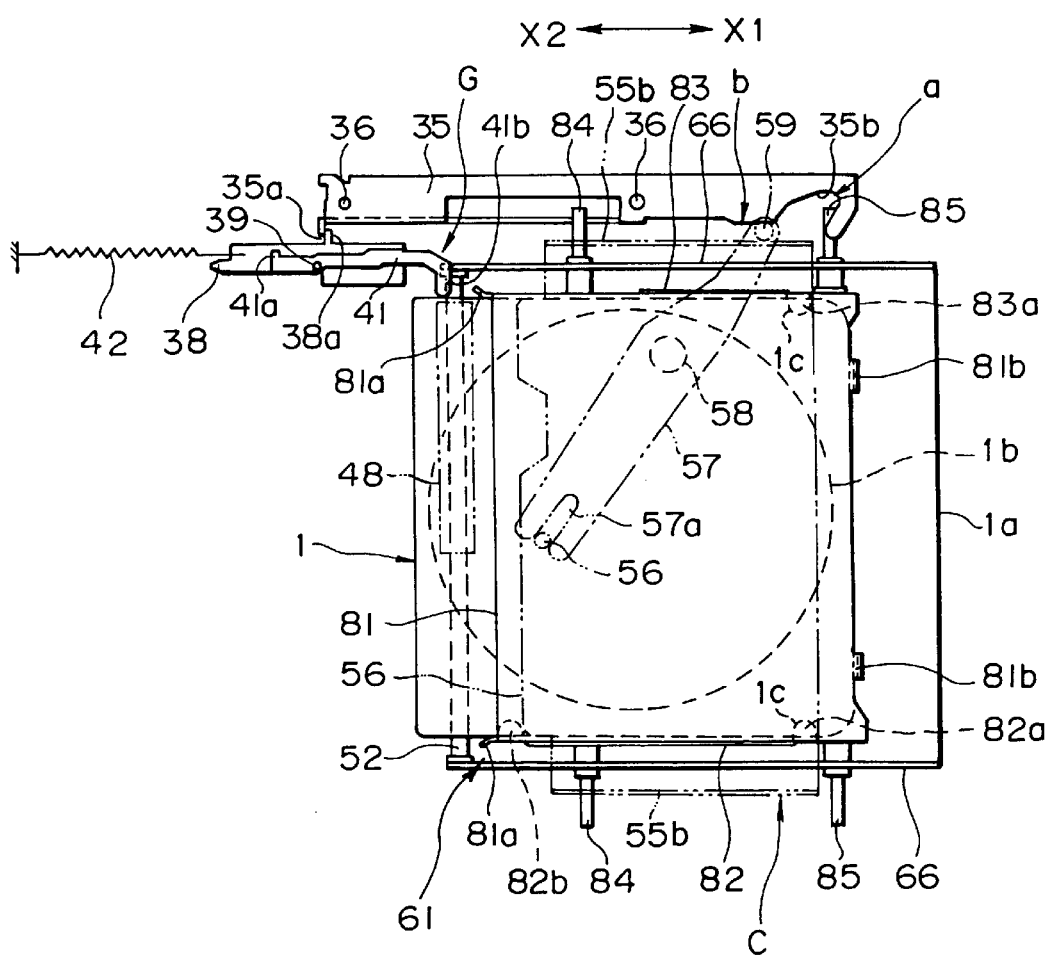
FIG. 6 is a plan view showing a third stage of the loading operation in which the recording medium is fed from the housing section into the holding section.

As shown in FIGS. 1 and 2, a driving arm 57 is provided on the upper surface of the upper chassis 51. This driving arm 57 is supported rotatably by a supporting shaft 58 with respect to the upper chassis 51. In addition, a driving groove 57a is cut into the right end tip portion of the driving arm 57, and the sliding shaft 56, which is fixed to the driving plate 55, passes through the elongated hole 51a and engages with the driving groove 57a. The driving arm 57 has a fixed shaft 59 attached to its left end portion. As shown in FIG. 3, the rear (X1 direction) end portion of the driving lever 35 is equipped with a cam section 35b which, in turn, engages with the aforesaid shaft 59. Further, as shown in FIG. 3, when the driving lever 35 moves in the X2 direction, the driving arm 57 rotates counterclockwise and the driving plate 55 moves in the X1 direction. On the other hand, when the driving lever 35 moves in the X1 direction, the driving arm 57 rotates clockwise through the cam section 35b, so that, as shown in FIGS. 4 to 6 the driving plate 55 shifts in the X2 direction.

The loading unit C includes a loading section 61 placed under the upper chassis 51. A central portion of the mini-disk 1b housed in the cartridge 1a of the recording medium 1 is fitted on a loading base 62 of the loading section 61, and a turntable 63 is provided thereon. On the lower surface of the loading base 62 there is provided a spindle motor, the power of which rotationally drives the turntable 63 and further rotationally drives the mini-disk 1b within the cartridge 1a. In addition, in the loading section 61, an optical head 64 is located to read data from the recording medium 1, and on the loading base 62, a positioning pin 65 is fixed for positioning the cartridge 1a of the recording medium 1.

As shown in FIG. 2, to the right side plate 66 of the loading section 61 there are fixed supporting shafts 67, 67 protruding sideways and supported by a damper 68. This damper 68 is fixedly secured onto the inner surface of the side chassis 18. Likewise, supporting shafts are fixedly secured onto the left side plate of the loading section 61 and are supported by a damper fixedly secured onto the inner surface of the side chassis 19. The damper 68 has a rubber bag body filled with a high-viscosity fluid such as a silicone oil. In the loading unit C, the loading section 61 is elastically supported through the dampers to be movable between the side chassis 18 and 19. It is also appropriate that the loading section 61 is elastically supported through coil springs from the side chassis 18, 19 or the upper chassis 51. In addition, the supporting shaft 52 facing the lower side of the transferring roller 48 is rotatably supported at the rear (X2 direction) end portion of the side plate 66 of the loading section 61.

As shown in FIG. 13, when the recording medium 1 stored in the housing section B is transferred toward the loading section 61, the recording medium 1 is held between the transferring roller 48 and the supporting shaft 52. When the recording medium 1 is in the transferred state, the loading section 61 supported by the damper 68 in the floating condition enters a locked state with respect to the side chassis 18 and 19 by means of a lock mechanism I which will be described hereinafter. In this locked state, the supporting shaft 52 provided at the loading section 61 side comes to a parallel and opposed relation to the transferring roller 48 supported by the side chassis 18 and 19. In this case, since the supporting shaft 52 for supporting the lower surface of the recording medium 1 is supported in the loading section 61, and the relative position between the supporting shaft 52 and the loading base 62 equipped with the turntable 63 is provided with a high accuracy, the lower surface of the recording medium 1 is guided along the supporting shaft 52 and positioned precisely on the loading base 62.

The side plate 66 of the loading section 61 has an elongated hole 66a formed therein. The inner surface of the side plate 66 is provided with a biasing plate 69, and a sliding piece 69a, being a bent portion of the biasing plate 69, is inserted into the elongated hole 66a so that the biasing plate is movable in the X1 and X2 directions with respect to the side plate 66. In addition, between the biasing plate 69 and the side plate 66 there is stretched a biasing spring 71 which causes the biasing plate 69 is always biased in the X2 direction.

In the side plate 66, a pair of guide holes 72 and 73 are formed as a guiding means. Each of the guide holes 72 and 73 has a L-shaped configuration comprising a vertical guide section 72a or 73a extending vertically (in the Y directions) and a horizontal guide section 72b or 73b. A pair of biasing holes 74 and 75 are formed in the biasing plate 69. Each of the biasing holes 74 and 75 has a bent configuration comprising a pressing inclined section 74a or 75a and a horizontal escaping section 74b or 75b.

A holding member 81 is provided in the inner side of the loading section 61. This holding member 81 is constructed by bending a sheet metal or the like, and includes holding guide sections 81a, 81a formed at both ends thereof to hold the end portions of the recording medium 1. A holding leaf spring 82 is fixedly secured onto the right side plate (the lower side plate in FIG. 3) of the holding member 81. Further, at the rear (X1 direction) end portion of the holding leaf spring 82, there is formed a holding bent section 82a, which is inserted into the holding member 81. On the other hand, at the front (X2 direction) end portion of the holding leaf spring 82, there is provided a biasing piece 82b, which is also inserted into the holding member 81. In addition, a holding leaf spring 83 is fixed to the outside of the left side plate (the upper side plate in FIG. 3) of the holding member 81. A holding bent section 83a is formed at the rear (X1 direction) end portion of the holding leaf spring 83. This holding bent section 83a is also inserted into the holding member 81.

As shown in FIG. 6, in the state that the recording medium 1 is completely inserted into the holding member 81, the aforesaid holding bent sections 82a and 83a are elastically fitted in the recess portions 1c, 1c formed on the side surfaces of the cartridge 1a, and the side portion of the cartridge 1a is also pressed by the biasing piece 82b, whereupon the recording medium 1 is completely held within the holding member 81.

As shown in FIGS. 2 and 3, guide shafts 84 and 85 are fixedly secured to both the side plates of the holding member 81. In FIG. 2, the assembling direction for the guide shafts 84 and 85 is indicated by (* -5). The guide shaft 84 is inserted into the biasing hole 74 of the biasing plate 69 and into the guide hole 72 made in the side plate 66 of the loading section 61. Further, the tip portion of the guide shaft 84 extends into the escaping section 51c formed in the side plate 51e of the upper chassis 51. On the other hand, the guide shaft 85 is inserted into the biasing hole 75 of the biasing plate 69 and into the guide hole 73 of the side plate 66, and its tip portion extends into the escaping section 51d formed in the side plate 51e of the upper chassis 51.

Figure 8A:
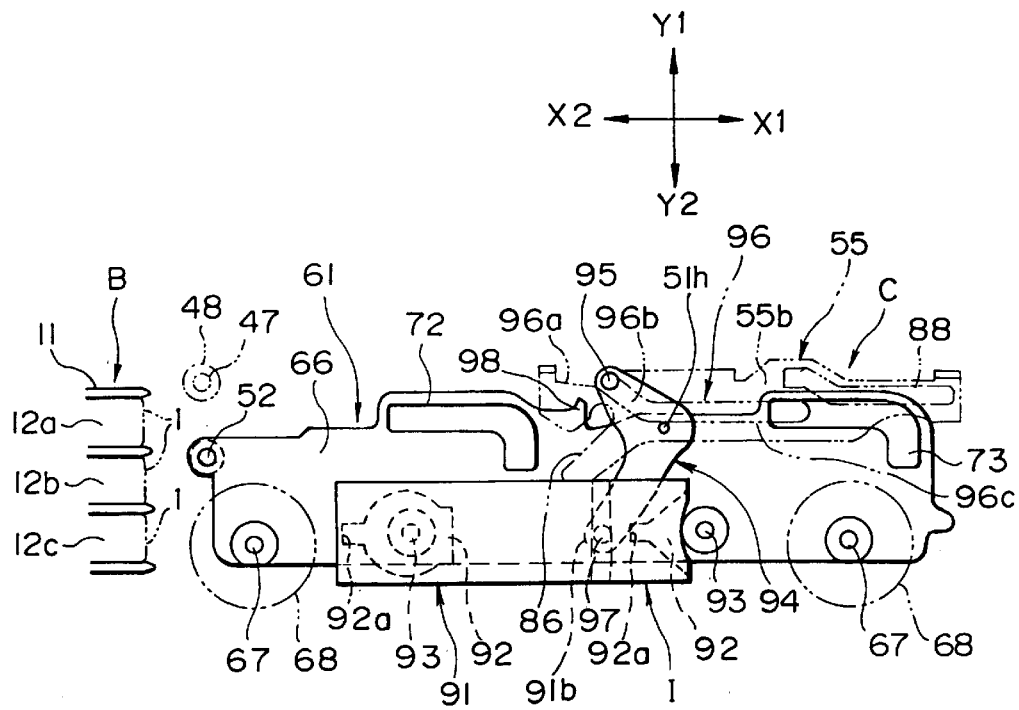
FIGS. 8A and 8B are side elevational views of a loading unit, in which a holding member is in an initial position.
Figure 8B:
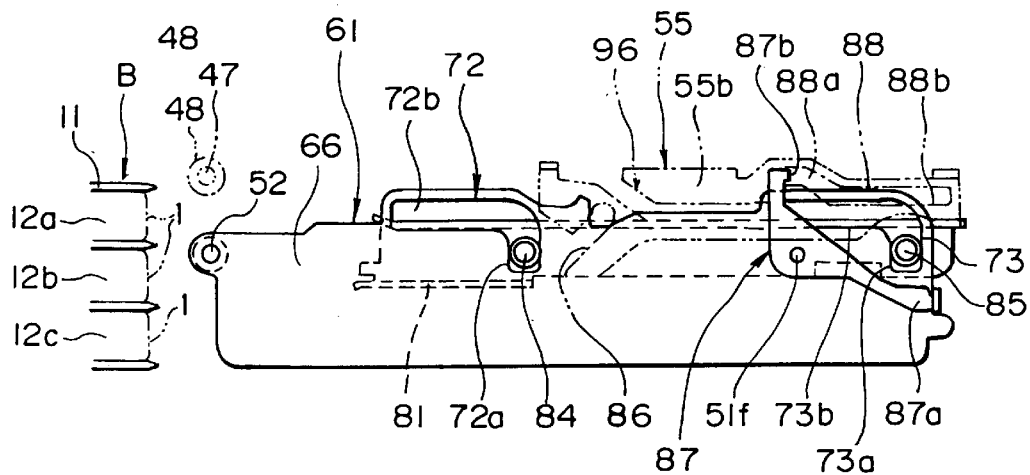

As shown in FIG. 3, the side plate 55b of the driving plate 55 is positioned outside of the side plate 66 of the loading section 61 and in the inside of the side plate 51e of the upper chassis 51. As shown in FIGS. 2, 8A and 8B, at the front (X2 direction) end portion of the side plate 55b of the driving plate 55 there is formed a lifting cam section 86 composed of an inclined groove (an inclined hole). As shown in FIG. 8B, when the driving plate 55 moves in the X1 direction, the lifting cam section 86 is separated from the guide shaft 84. On the other hand, when the driving plate 55 moves in the X2 direction, as successively shown in FIGS. 9 to 11, the guide shaft 84 is lifted by the lifting cam section 86 and moves upwardly along the vertical guide section 72a of the guide hole 72 and subsequently enters the horizontal guide section 72b.

As shown in FIGS. 2 and 8B, a lifting arm 87 is provided at the rear (X1 direction) end portion of the side plate 51e of the upper chassis 51. This lifting arm 87 is rotatably supported at a supporting section 51f of the side plate 51e. The lifting arm 87 has an arm section 87a and a bent piece 87b. The bent piece 87b extends from the escaping section 51g to the inside thereof. A crank-shaped guide cam section 88 is formed in the side plate 55b of the driving plate 55, and the bent piece 87b is inserted slidably into the guide cam section 88 after passing through the escaping section 51g. As shown in FIG. 8B, when the driving plate 55 moves in the X1 direction, the bent piece 87b is positioned in an upper step portion 88a of the guide cam section 88 and the lifting arm 87 rotates clockwise. On the other hand, when the driving plate 55 moves in the X2 direction, as successively shown in FIGS. 9A to 11B, the bent piece 87b shifts to a lower step portion 88b of the guide cam section 88 and the lifting arm 87 rotates counterclockwise. At this time, the guide shaft 85 is lifted by the arm portion 87a of the lifting arm 87 and moves from the vertical guide section 73a of the guide hole 73 to the horizontal guide section 73b thereof.

Located on inside surfaces of the side chassis 18 and 19 is placed a lock mechanism I which locks the loading section 61. A lock member 91 is provided in the inside of the side chassis 18. Likewise, a lock member 91 constituting the lock mechanism I is located in the inside of the side chassis 19. The description will be made of the side chassis 18 side mechanism only. The lock member 91 has a block-like configuration made of a synthetic resin or the like. On an outer surface of the lock member 91 there are integrally formed sliding pieces 91a, 91a, which are inserted into the elongated holes 18b, 18b of the side chassis 18. With this structure, the lock member 91 is supported slidably in the X1 and X2 directions on the inside of the side chassis 18. A pair of lock cams 92, 92 are formed in the inside of the lock member 91 in the form of a recess, and lock shafts 93, 93, which are fixed to the side plate 66 of the loading section 61, extend into the lock cams 92, 92, respectively. The rearward (X2 direction) end portions of the lock cams 92, 92 include restraining sections 92a, 92a where the recess portions are narrowed. As shown in FIG. 10A, when the lock member 91 has completely moved in the X1 direction, the lock shafts 93, 93 are received within the restraining sections 92a, 92a, and the loading section 61 is locked so as not to move in the Y1, Y2 and X2 directions.

A lock driving arm 94 is provided between the side plate 51e of the upper chassis 51 and the lock member 91. This lock driving arm 94 is rotatably supported by a supporting portion 51h formed in the side plate 51e of the upper chassis 51. A pin 95 is fixedly secured to one end portion of the lock driving arm 94. This pin 95 is inserted into an escaping section 51i of the side plate 51e and is further inserted into a guide cam section 96 formed in the side plate 55b of the driving plate 55. To the other end portion of the lock driving arm 94 there is fixedly secured a driving pin 97, which is inserted into a driving groove 91b formed in the lock member 91.

Figure 9A:
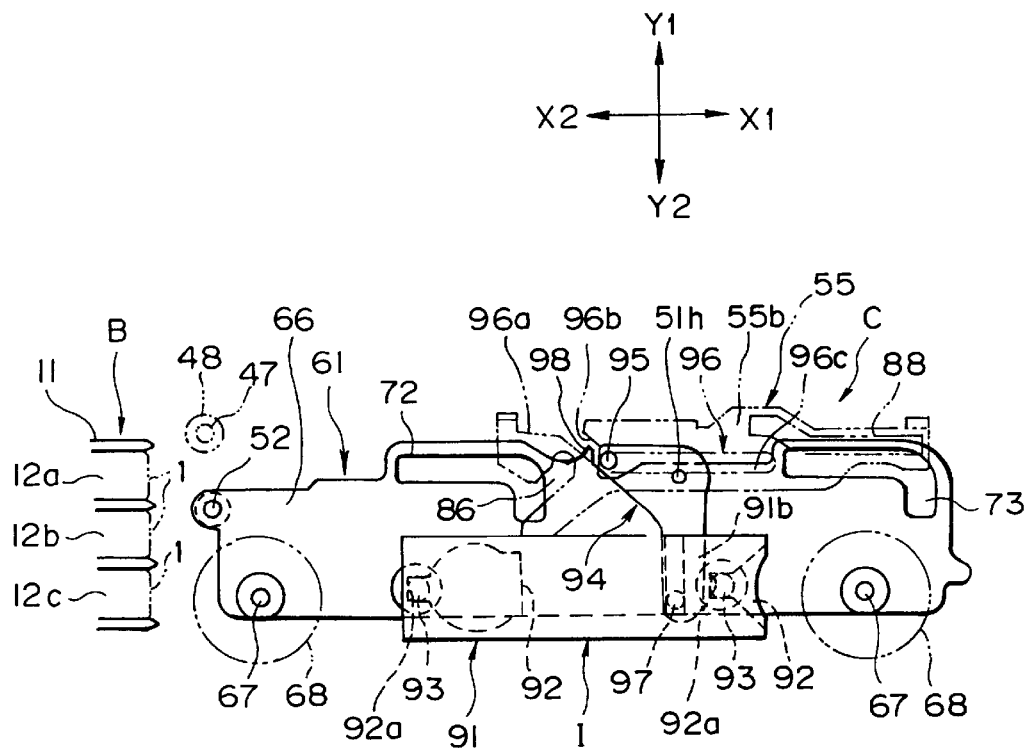
FIGS. 9A and 9B are side elevational views showing a first stage of operation of the loading unit, in which the loading section is in a locked condition.

The aforesaid guide cam section 96 has an upper step portion 96a, an inclined driving portion 96b and a lower step portion 96c. As shown in FIG. 8A, when the driving plate 55 moves in the X1 direction, the pin 95 is positioned at the upper step portion 96a of the guide cam section 96 and the lock driving arm 94 rotates clockwise. Accordingly, the lock member 91 moves in the X2 direction into an unlocked position. When the driving plate 55 moves in the X2 direction, the lock driving arm 94 is rotated counterclockwise by the inclined driving portion 96b of the guide cam section 96. At this time, by the driving pin 97 the lock member 91 is shifted in the X1 direction into a locked position. As shown in FIG. 9A, when the lock driving arm 94 rotates counterclockwise, the pin 95 engages with a lock piece 98, formed on a top end portion of the side plate 66 of the loading section 61, from the X1 direction side, so that the loading section 61 is locked so as not to move in the X1 direction.

Moreover, a description will be made hereinbelow of an operation of the recording medium conveying system. FIGS. 3 to 7 are plan views showing the processes until the recording medium 1 is loaded from the housing section B onto the loading unit C, and FIGS. 8A to 11B are side elevational views of the loading unit C, showing the processes until the recording medium 1 is loaded from the housing section B onto the loading unit C. FIGS. 8A and 8B show the operations at the same instant, the same state being separately shown in view of the fact that parts are overlapped with each other in the illustrations. This applies to FIGS. 9A, 9B and FIGS. 11A, 11B. FIGS. 8A, 9A, 10A and 11A mainly show the operations of the lock mechanism I, while FIGS. 8B, 9B, 10B and 11B chiefly illustrate the guide operations of the loading section 61.

FIGS. 14A to 14C show the operations of the elastic biasing member adjusting mechanism J regarding the switching of the elastic holding pressure from the transferring roller 48 and the supporting shaft 52 to the recording medium 1. Of these illustrations, FIG. 14A shows the state that the recording medium 1 is inserted from the housing section B between the transferring roller 48 and the supporting shaft 52 while it is not elastically held by the transferring roller 48 and the supporting shaft 52, FIG. 14B shows the state immediately after the recording medium 1 is elastically held by the transferring roller 48 and the supporting shaft 52 following the state of FIG. 14A, and FIG. 14C shows the state that the recording medium 1 is released from the elastic holding by the transferring roller 48 and the supporting shaft 52 and then held by the holding member 81 to be drawn in the X1 direction.

In this recording medium conveying system, the recording media 1 are inserted through the opening formed in the nose section provided in front of the housing A. The recording media 1 are inserted and placed in the accommodating areas 12a, 12b and 12c of the housing section B.

FIGS. 3, 8A and 8B show the state in which the recording medium 1 is not loaded in the loading section 61. At this time, the driving lever 35 is shifted in the X2 direction. Accordingly, the inserting piece 35a provided at the front (X2 direction) end portion of the driving lever 35 is separated from the pressed piece 38a. Further, the driving arm 57 is rotated counterclockwise by means of the cam section 35b formed on the driving lever 35, and the driving plate 55, which is engaged with the driving arm 57 through the driving shaft 56, is moved in the X1 direction. When the driving plate 55 moves in the X1 direction, as shown in FIG. 8A, the pin 95 of the lock driving arm 94 is positioned at the upper step portion 96a of the guide cam section 96 of the driving plate 55, and the lock driving arm 94 rotates clockwise. Thus, the lock member 91 of the lock mechanism I is shifted in the X2 direction by means of the driving pin 97. At this time, the lock shafts 93, 93 fixed onto the side plate 66 of the loading section 61 separate from the restraining portions 92a, 92a of the lock member 91 and the pin 95 also separates from the lock piece 98. Accordingly, the loading section 61 is movably and elastically supported by the damper 68 with respect to the side chassis 18 and 19.

Furthermore, as shown in FIG. 8B, the lifting cam section 86 of the driving plate 55, which moves in the X1 direction, separates from the guide shaft 84. In addition, the bent piece 87b of the lifting arm 87 is positioned within the upper step portion 88a of the guide cam section 88 of the driving plate 55, while the lifting arm 87 rotates clockwise and the arm section 87a separates from the guide shaft 85. Thus, a force is not applied from the driving plate 55 and the lifting arm 87 to the guide shafts 84 and 85. In FIG. 8B, the guide shafts 84 and 85 are positioned within the vertical guide sections 72a, 73a of the guide holes 72 and 73 formed in the side plate 66 of the loading section 61, respectively. In the inside of this side plate 66, the biasing plate 69 is provided and biased in the X2 direction by the elastic force of the biasing spring 71, and hence, in response to the biasing force the guide shafts 84 and 85 are pressed against the lower end portions of the vertical guide sections 72a and 73a, respectively.

That is, the guide shaft 84 is pressed against the lower end portion of the vertical guide section 72a by means of the pressing inclined section 74a of the biasing hole 74 formed in the biasing plate 69. Similarly, the guide shaft 85 is pressed against the lower end portion of the vertical guide section 73a by means of the pressing inclined section 75a of the biasing hole 75. Operation of the biasing plate 69 is shown in detail in FIGS. 12A and 12B. As shown in FIGS. 12A and 12B, the vertical guide section 73a (and 72a) of the guide hole 73 (and 72) formed in the side plate 66 of the loading section 61 extends vertically, while the pressing inclined section 75a (and 74a) of the biasing hole 75 (and 74) formed in the biasing plate 69 is inclined by an angle α in a counterclockwise direction with respect to the vertical direction. Accordingly, the X2 direction biasing force applied to the biasing plate 69 by the biasing spring 71 is applied as a pressing force in the Y2 direction with respect to the guide shafts 84 and 85 positioned at the vertical guide section 72a and 73a. For this reason, the holding member 81 attached to the guide shafts 84 and 85 is shifted in the X1 direction and stops at a first position approaching the loading base 62 of the loading section 61.

Moreover, when the driving lever 35 reaches the end in the X2 direction in the state as shown in FIG. 3, in the biasing member adjusting mechanism J, as shown in FIG. 13, the end portion 47a of the roller shaft 47 is in the second recessed portion 103c of the switching cam section 103. Accordingly, the roller supporting plate 45 rotates in the Y2 direction by the biasing force of the biasing spring 102 and the biasing plate 49. In this embodiment, when the driving lever 35 moves in the X2 direction as shown in FIG. 3, the recording medium 1 is not transferred by the transferring roller 48. Thus, at this time, the end portion 47a of the roller shaft 47 can also be lifted in the Y1 direction by the raised portion 103b of the switching cam section 103. However, when the recording medium conveying system is not in use (in a non-operated condition), it is maintained for a long time in the state that the driving lever 35 is shifted in the X2 direction. For this reason, if the roller shaft 47 is lifted by the raised portion 103b, there is a possibility that the biasing spring 102 is left in the state of being compressed and, hence, weakened by fatigue. Accordingly, in this embodiment, when not in use, the roller shaft 47 is positioned in the second recessed portion 103c and the roller shaft 47 is lowered in the Y2 direction so that the biasing spring 102 is in a resting condition, thereby preventing fatigue.

When the operating section, not shown, performs the selection of one of the recording media 1 housed in the accommodating areas 12a, 12b and 12c of the housing section B, in accordance with a command from a control circuit, not shown, the selection motor M1 as shown in FIG. 1 starts to operate. The selection motor M1 rotationally drives the driving rotating body E, which drives the follower shaft 32, which is guided by the cam channel 28a formed in the large diameter gear 28, such that the elevating member D is driven in the X1 or X2 direction. The moving force of the elevating member D in the X1 or X2 directions is applied from the inclined driving holes 23a, 23b, 24a and 24b to the shafts 21 and 22 in the Y1 or Y2 directions, and the loading unit C lifts or lowers along the elongated holes 14a, 14b, 15a and 15b of the housing A. The rotational angle of the large diameter gear 28 is monitored by a detection member, not shown, and the selection motor M1 stops at the position for selecting the recording medium 1 in one of the accommodating areas 12a, 12b and 12c of the housing section B, and then the loading unit C stops. FIGS. 8A to 11b show the state in which the loading unit C stops at the position to select the uppermost recording medium 1. Immediately after the loading unit C stops at a given selection position, the driving motor M2 of the driving means F, which is placed on the side chassis 19 of the loading unit C, starts to operate so that the driving lever 35, being the driving member of the driving means F, moves in the X1 direction. In addition, the driving arm 57, which is rotated clockwise by the cam section 35b of the driving lever 35, and the driving plate 55, which is linked to the driving arm 57, are shifted in the X2 direction.

Figure 7:
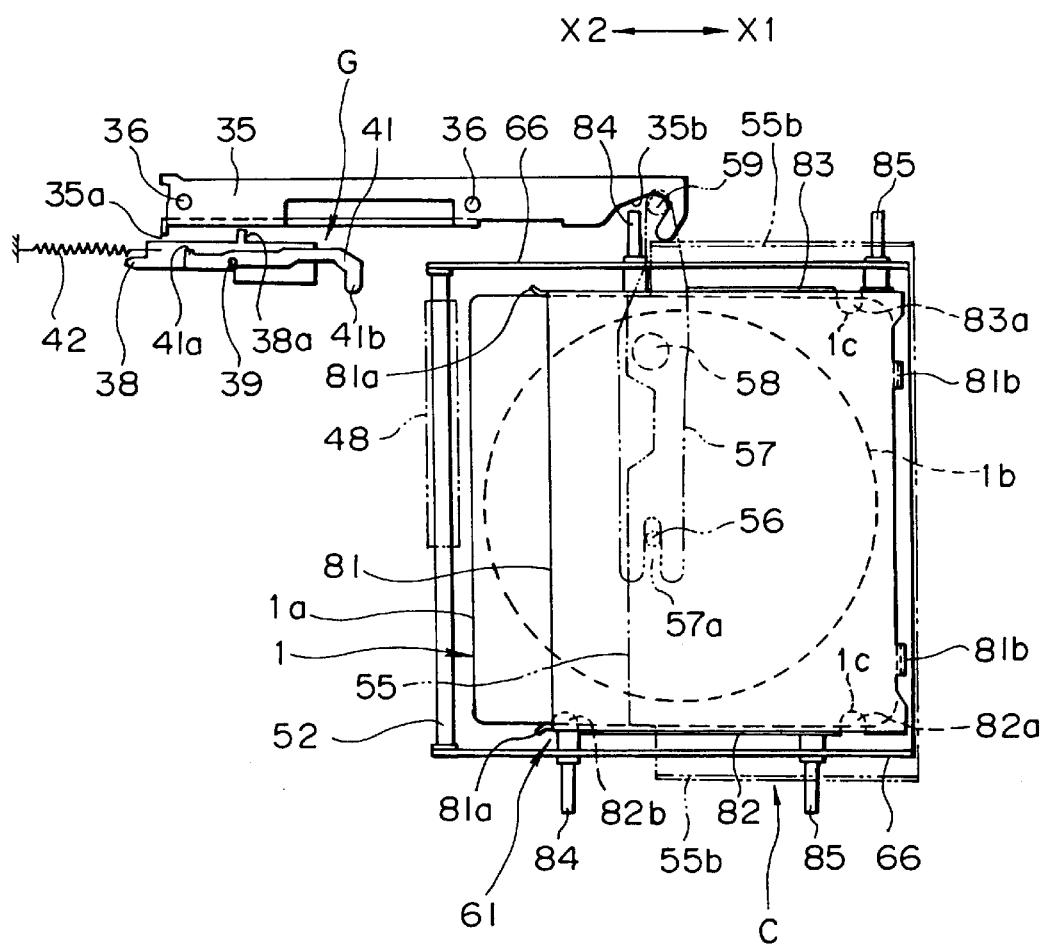
FIG. 7 is a plan view showing a fourth stage of the loading operation in which the recording medium, which is held by the holding member, is loaded in the loading section.

In this case, the loading section 61 is subjected to the lock operation during the time in which the driving lever 35 moves by the distance L in FIG. 3, i.e., in the process before the inserting piece 35a of the driving lever 35 strikes the pressed piece 38a of the sliding member 38. After the completion of the lock operation of the loading section 61, when the driving lever 35 further moves in the X1 direction, as shown in FIGS. 5 and 11B, the holding member 81 moves to a third position closest to the housing section B. When the driving lever 35 moves fully in the X1 direction, in the transferring means H and the biasing member adjusting mechanism J, as shown in FIG. 14B, the recording medium 1 is held elastically by the transferring roller 48 and the supporting shaft 52. Further, the recording medium 1 selected from the housing section B is transferred by the transferring roller 48 and fed to the holding member 81. Thereafter, the driving motor M2 rotates reversely so that the driving lever 35 returns in the X2 direction. At this time, the holding member 81 moves in the X1 direction and the recording medium 1 held by the holding member 81 is transferred in the X1 direction. As shown in FIG. 14C, the recording medium 1 is released from the elastic biasing force by the transferring roller 48 and the supporting shaft 52. Further, when, as shown in FIG. 7, the driving lever 35 completely returns in the X2 direction, the recording medium 1 held by the holding member 81 is put on the loading base 62. A detailed description will be made hereinbelow of the above operation.

During the initial process, in which the driving lever 35 moves in the X1 direction from the state as shown in FIGS. 8A and 8B and the driving plate 55 moves in the X2 direction, the pin 95 is guided in the Y2 direction by means of the inclined driving portion 96b of the guide cam section 96 formed in the driving plate 55 and the lock driving arm 94 is rotated counterclockwise. In the state shown in FIG. 9A, the pin 95 engages with the lock piece 98 of the side plate 66 of the loading section 61, with the result that the loading section 61 is locked so as not to move in the X1 direction. In addition, the lock member 91 is driven in the X1 direction by the driving pin 97 of the lock driving arm 94. At the point shown in FIG. 9A, the lock shafts 93, 93 provided on the loading section 61 approximately enter the engaging condition with the restraining portions 92a, 92a of the lock cams 92, 92 formed in the lock member 91.

That is, in the state shown in FIG. 9A, locking of the loading section 61 in the X1 direction is completed by the pin 95, and due to the lock member 91 the loading section 61 is almost locked against the movement in the X2, Y1 and Y2 directions, or enters this state immediately before locking in the X2, Y1 and Y2 directions is completed. Accordingly, at the time that the driving plate 55 is slightly shifted in the X2 direction from the FIG. 9A state and the lock member 91 is slightly shifted in the X1 direction, the lock shafts 93, 93 completely engage with the restraining portions 92a, 92a and the loading section 61 completely enters the locked condition in the X1, X2 and Y1, Y2 directions. At the point shown in FIG. 9B, the guide shafts 84 and 85 are still positioned in the vertical guide sections 72a and 73a, respectively, and the holding member 81 is lowered relative to the loading base 62.

Figure 9B:
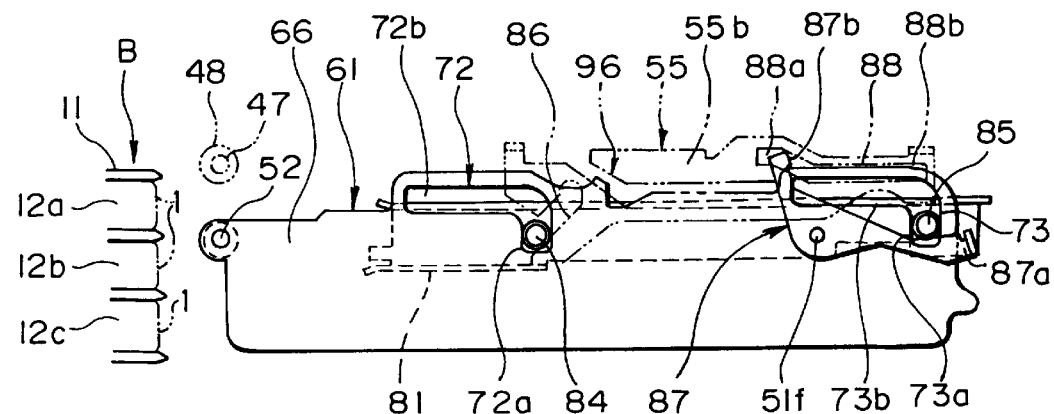
Figure 10B:
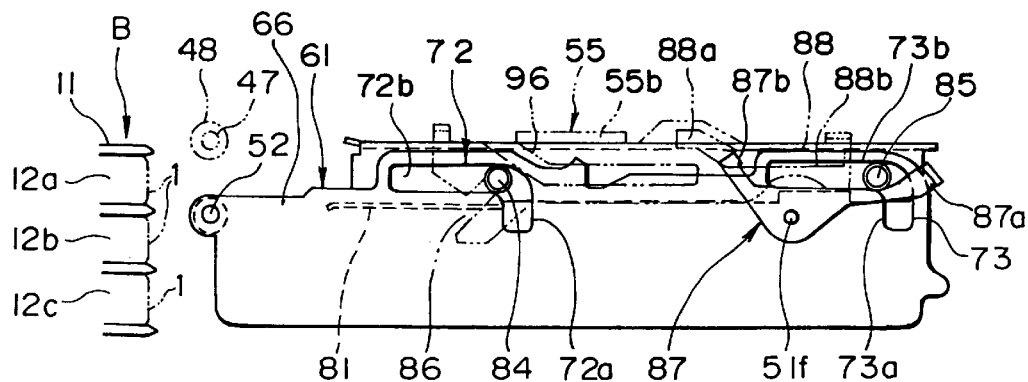

When the driving lever 35 further moves in the X1 direction and the driving plate 55 further moves in the X2 direction as compared with the state as shown in FIGS. 9A and 9B, as shown in FIG. 10B the guide shaft 84 is lifted in the Y1 direction by means of the lifting cam section 86 of the driving plate 55 and is shifted to the horizontal guide section 72b. Simultaneously, the bent piece 87b of the lifting arm 87 is shifted to the lower step portion 88b of the guide cam section 88 and the lifting arm 87 is rotated counterclockwise. The arm section 87a of the lifting arm 87 lifts the guide shaft 85 in the Y1 direction and the guide shaft 85 is shifted to the horizontal guide portion 73b of the guide hole 73. Thus, at the point shown in FIG. 10B, the holding member 81 takes the raised position separated from the loading base 62. Subsequently, the moving force of the driving plate 55 in the X2 direction is applied from the lifting cam section 86 to the guide shaft 84 and the holding member 81 is shifted in the X2 direction by the horizontal guide sections 72b, 73b of the guide holes 72 and 73.

Before reaching the state shown in FIG. 10A, i.e., immediately after the state shown in FIG. 9A, the lock shafts 93, 93 are completely fitted into the restraining portions 92a, 92a of the lock member 91 so as to complete the locking operation of the loading section 61 in the X1 and X2 directions and in the Y1 and Y2 directions. Accordingly, the guide shafts 84 and 85 are shifted from the vertical guide sections 72a and 73a to the horizontal guide sections 72b and 73b, respectively, and while the holding member 81 moves upwardly in the Y1 direction and further moves in the X2 direction, the loading section 61 is locked by the lock member 91 and the driving pin 97 of the driving arm 94 so as not to move with respect to the side chassis 18 and 19. When the loading section 61 supported by the damper 68 on the side chassis 18 and 19 is in the locked condition, the transferring force is applied to the holding member 81 guided by the guide holes 72 and 73 of the loading section 61, and hence, while the holding member 81 is shifted by the driving plate 55 in the Y1 and X2 directions, the loading section 61 does not move and the holding member 81 reliably moves.

When the driving plate 55 reaches the position shown in FIGS. 10A and 10B and the holding member 81 is lifted from the loading section 61, as shown in FIG. 4 the inserting piece 35a of the driving lever 35 starts to press the pressed piece 38a in the X1 direction. FIG. 4 shows the state that the pressed piece 38a is pressed to cause the sliding member 38 to slightly move in the X1 direction and the feeding piece 41b of the feeding lever 41 is fitted into the recess portion 1c formed in the side portion of the cartridge 1a of the recording medium 1.

Furthermore, in the process that the driving lever 35 moves in the X1 direction, the driving arm 57 rotates clockwise and the driving plate 55 moves to the end position in the X2 direction. At this time, as shown in FIGS. 10B and 11B, the guide shaft 84 is held in the inclined groove of the lifting cam section 86 of the driving plate 55 and the guide shafts 84 and 85 slide along the horizontal guide sections 72b and 73b and move to the end position in the X2 direction. At this time, as shown in FIG. 11A, the pin 95 fixed to the lock driving arm 94 moves within the lower step portion 96c of the guide cam section 96 of the driving plate 55, and without the change of the position of the lock driving arm 94 the loading section 61 remains in the state locked by the lock driving arm 94 and the lock member 91. Similarly, the bent piece 87b of the lifting arm 87 moves within the lower step portion 88b of the guide cam section 88 and the rotational position of the lifting arm 87 does not change.

Moreover, when the driving lever 35 moves in the X1 direction, as shown in FIG. 13, the end portion 47a of the roller shaft 47 slides along the raised portion 103b of the switching cam section 103, and the roller shaft 47 and the roller supporting plate 45 are lifted so that the distance between the transferring roller 48 and the supporting shaft 52 in the Y1 and Y2 directions becomes greater than the thickness dimension of the recording medium 1. FIG. 14A shows the state immediately before the driving lever 35 reaches the end position in the X1 direction, and at this time the end portion 47a of the roller shaft 47 is positioned close to the boundary between the raised portion 103b and first recessed portion 103a of the switching cam section 103, and the roller shaft 47 remains lifted in the Y1 direction.

While the driving lever 35 moves in the X1 direction from the position shown in FIG. 4 and before reaching the position shown in FIG. 14A, the inserting piece 35a of the driving lever 35 moves the sliding member 38 of the feeding means G in the X1 direction. Further, the feeding piece 41b of the feeding lever 41 presses the recess portion 1c, thus feeding the recording medium 1 in the X1 direction. Due to this feeding force, the rear (X1 direction) end portion of the recording medium 1 is fed between the transferring roller 48 and the supporting shaft 52. At this time, as shown in FIG. 14A the roller shaft 47 is still lifted in the Y1 direction and the distance between the transferring roller 48 and the supporting shaft 52 is greater than the thickness dimension of the recording medium 1. Hence, the recording medium 1, which is pushed by the feeding lever 41, is easily inserted between the transferring roller 48 and the supporting shaft 52 without substantial resistance. Accordingly, an excessive resistance is not applied to the feeding lever 41, and the feeding lever 41 is not detached from the recess portion 1c of the recording medium 1. That is, the feeding lever 41, which is engaged with the shallow recess portion 1c at the side portion of the recording medium 1, reliably feeds the recording medium 1 between the transferring roller 48 and the supporting shaft 52. When the recording medium 1 is positioned between the transferring roller 48 and the supporting shaft 52, the feeding lever 41 is rotated counter-clockwise by the guide 43 so that the feeding piece 41b separates from the recess portion 1c.

FIG. 5 shows the state in which the driving lever 35 moves further from the FIG. 14A position and reaches the end position in the X1 direction. At the point shown in FIG. 5, or immediately before that point, the holding member 81 moves to a limit position in the X2 direction, and the front (X2 direction) opening of the holding member 81 approaches the position closest to the uppermost accommodating area 12a of the housing section B to receive the recording medium 1. When the driving lever 35 reaches the end position in the X1 direction, as shown in FIG. 14B the end portion 47a of the roller shaft 47 is shifted into the first recessed portion 103a of the switching cam section 103 so that the roller shaft 47 and the roller supporting plate 45 are lowered in the Y2 direction. Due to the elastic force of the biasing spring 102, the transferring roller 48 and the supporting shaft 52 elastically hold the recording medium 1 with a force that is substantially greater than that applied by the transferring roller 48 and the supporting shaft 52 during insertion of the recording medium 1.

Furthermore, as shown in FIG. 14A, when the recording medium 1 is fed between the roller shaft 47 and the supporting shaft 52, the detection end 105a of the detection means K (shown in FIGS. 2 and 13) is pressed in the Z2 direction by the rear end portion of the recording medium 1, thereby causing the detection lever 105 to rotate counter-clockwise. Further, the detection switch 109 is pressed by the pressing end 105b formed on the rear end portion of the detection lever 105 so that the detection output of the detection switch 109 enters the ON state. The ON detection output from the detection switch 109 is transmitted to the control circuit, not shown, to confirm that the recording medium 1 is received in the transferring means H. After this confirmation, the transferring and drawing operations for the recording medium 1, which will be described below, i.e., the returning operation of the driving lever 35 in the X2 direction, starts.

The feeding motor M3 already starts before the point shown in FIG. 14A, and when, as shown in FIG. 14B, the recording medium 1 is held between the transferring roller 48 and the supporting shaft 52, the transferring force is applied from the transferring roller 48 to the recording medium 1, with the result that the recording medium 1 is immediately transferred toward the holding member 81. It is also possible that, after the confirmation of the fact that the output of the detection switch 109 turns ON, at the point shown in FIG. 14B, the feeding motor M3 starts to rotate the transferring roller 48.

In the state shown in FIGS. 5 and 14B, the recording medium 1 is fed into the holding member 81 by the transferring roller 48. The recording medium 1 is guided by the holding guide portion 81a of the holding member 81 during transfer in the X1 direction. When the recording medium 1 is transferred to the position shown in FIG. 6, the recording medium 1 strikes a stopper 81b placed at the rear end portion of the holding member 81. At this time, the holding bent sections 82a and 83a of the holding leaf springs 82 and 83 provided at both side portions of the holding member 81 are fitted into the recess portions 1c, 1c formed on both side portions of the recording medium 1 so that the recording medium 1 is completely held within the holding member 81. When the recording medium 1 is held in the holding member 81, the front end portion of the recording medium 1 is still positioned under the transferring roller 48. Accordingly, the recording medium 1 is surely transferred by the transferring roller 48 up to the position at which it is completely held within the holding member 81. In addition, since, owing to the elastic force of the biasing spring 102 as shown in FIG. 13, the transferring roller 48 and the supporting shaft 52 elastically hold the recording medium 1 with a strong force, the recording medium 1 is reliably fed by the transferring roller 48 in the X1 direction and the holding bent portions 82a and 83a completely engage with the recess portions 1c, 1c irrespective of the reception resistance applied from the holding leaf springs 82 and 83.

Upon detection that the recording medium 1 has been completely inserted into and held by the holding member 81 positioned as shown in FIG. 6, the driving motor M2 operates reversely so that the driving lever 35 returns in the X2 direction. Accordingly, the driving arm 57 rotates counter-clockwise and the driving plate 55 moves in the X1 direction. As shown in FIG. 11B, the guide shaft 84 fixed to the holding member 81 is held in the inclined groove of the lifting cam section 86 of the driving plate 55, and hence, when the driving plate 55 moves in the X1 direction, the holding member 81 is guided by the horizontal guide sections 72b and 73b of the guide holes 72 and 73 to be returned in the X1 direction.

In the biasing member adjusting mechanism J, as shown in FIGS. 14A to 14C, immediately after the driving lever 35 starts to move in the X2 direction from the position as shown in FIG. 14B, the end portion 47a of the roller shaft 47 slides on the raised portion 103b of the switching cam section 103 and the roller shaft 47 and the roller supporting plate 45 are lifted, with the result that the distance between the transferring roller 48 and the supporting shaft 52 becomes greater than the thickness of the recording medium 1. Thus, when, as shown in FIG. 14C, the holding member 81 moves in the X1 direction, the elastic biasing force of the transferring roller 47 and the supporting shaft 52 is not applied to the recording medium 1. Accordingly, even if the rotation of the transferring roller 48 is stopped at the time that the recording medium 1 is inserted into the holding member 81 by the transferring roller 48 and held thereby, the resistance of the transferring roller 48 does not act on the recording medium 1, with the result that the recording medium 1 can be reliably drawn from between the transferring roller 48 and the supporting shaft 52 by movement of the holding member 81 in the X1 direction. In addition, even if the transferring roller 48 continues to rotate when the holding member 81 moves in the X1 direction, this rotating force does not operate on the recording medium 1.

Since, as described above, the resistance is not applied from the transferring roller 48 to the recording medium 1 when the recording medium 1 held by the holding member 81 is transferred in the X1 direction, the recess portions 1c, 1c of the recording medium 1 are not detached from the holding bent portions 82a, 83a of the holding springs 82 and 83 within the holding member 81.

While the driving lever 35 moves in the X2 direction and the driving plate 55 returns to the position shown in FIG. 10B and further moves in the X1 direction, the guide shaft 84 held by the lifting cam section 86 is returned to the vertical guide section 72a of the guide hole 72, and the lifting arm 87 rotates clockwise and the guide shaft 85 is returned to the vertical guide section 73a of the guide hole 73. At this time, as shown in FIG. 12B, the guide shafts 84 and 85 are pressed against the lower end portions of the vertical guide sections 72a and 73a by the pressing inclined portions 74a and 75a of the biasing holes 74 and 75 formed in the biasing plate 69, and the holding member 81 returns to its original position and is placed on the loading base 62, with the result that the recording medium 1 held by the holding member 81 is loaded on the loading base 62. That is, the cartridge 1a of the recording medium 1 is positioned by the positioning pin 65 on the loading base 62. Further, the clamp cap at the center of the mini-disk 1b within the cartridge 1a of the recording medium 1 is magnetically connected onto the turntable 63 (which includes a magnet) such that the mini-disk 1b and the turntable 63 become integrally connected. Moreover, the spindle motor rotationally drives the turntable 63 and the mini-disk 1b together and the optical head 64 reads out the recorded data therefrom.

Upon the loading of the recording medium 1 in the loading section 61, as shown in FIG. 8A the lock drive arm 94 rotates clockwise and the lock member 92 moves in the X2 direction so that the loading section 61 is released from the locked condition. Thus, the loading section 61 is elastically supported by the damper 68 to be movable with respect to the side chassis 18 and 19. For this reason, even if the vehicle body vibrations or the like are transmitted from the housing A to the side chassis 18, 19 and the upper chassis 51 of the loading unit C, because of being elastically supported, it does not have adverse influence on the loading section 61.

The operation for returning the recording medium 1 to the accommodating area of the housing section B after the completion of the reproduction operation is approximately the same as the operation for loading the recording medium 1. In this embodiment, after the completion of the reproduction, the recording medium 1 is returned to the uppermost accommodating area 12a. Accordingly, when the recording medium 1 is taken out from the housing section B and loaded in the loading section 61, and when the recording medium 1 is returned from the loading section 61 into the housing section B, the selection motor M1 remains stopped and hence the driving rotating body E does not change its rotational angle. As a result, the loading unit C remains stopped without lifting and lowering within the housing A.

In response to the completion of the reproducing operation, the driving lever 35, which is at the FIG. 7 position, is again driven by the driving motor M2 in the X1 direction. Further, as shown in FIGS. 3 to 6 and 8A to 11B, the lock driving arm 94 and the lock member 91 operate initially, and the loading section enters the locked state. Still further, the holding member 81 is guided by the vertical guide sections 72a and 73a to lift in the Y1 direction to reach the second position, with the recording medium 1 being separated from the loading base 62. Then, the holding member 81 is transferred in the X2 direction by means of the horizontal guide sections 72b and 73b to reach the third position approaching the accommodating area 12a of the housing section B (the state as shown in FIGS. 11A and 11B).

When the driving lever 35 reaches the FIG. 14A position immediately before the terminal in the X1 direction, the front end portion of the recording medium 1 held by the holding member 81 is inserted between the transferring roller 48 and the supporting shaft 52. That is, as shown in FIG. 6, the cam section 35b formed at the rear end portion of the driving lever 35 has a pressing inclined section "a" which rotates the driving arm 57 clockwise, and a flat section "b" following the pressing inclined section "a" and extending in the X1 and X2 directions. When the driving lever 35 moves in the X1 direction, at the point shown in FIG. 14A, the driving arm 57 is fully rotated clockwise by the pressing inclined section "a" and the holding member 81 reaches the position closest to the housing section B. That is, at this time, the front end portion of the recording medium 1 held by the holding member 81 is inserted between the transferring roller 48 and the supporting shaft 52. Since, at this time, the roller shaft 47, as shown in FIG. 14A, is lifted in the Y1 direction by the raised portion 103b of the switching cam section 103, the recording medium 1 held by the holding member 81 is insertable into between the transferring roller 48 and the supporting shaft 52 without any resistance.

While the driving lever 35 moves further in the X1 direction from the position shown in FIG. 14A and reaches the position shown in FIG. 14B, the shaft 59 of the driving arm 57 slides along the flat section "b" of the cam section 35b (see FIG. 6), while the driving arm does not move and hence the holding member 81 also does not move. In FIG. 14B, the end portion 47a of the roller shaft 47 is shifted to the first recessed portion 103a of the switching cam section 103, and, due to the biasing force of the biasing spring 102, the recording medium 1 is elastically held between the transferring roller 48 and the supporting shaft 52. The detection lever 105 senses the fact that the recording medium 1 is located between the transferring roller 48 and the supporting shaft 52. In response to the ON output from the detection switch 109, the control circuit issues a start-up command to the feeding motor M3, whereupon the transferring roller 48 starts to rotate. However, at this time, the rotating direction of the feeding motor M3 is opposite to the direction taken in the loading operation for the recording medium 1. Accordingly, due to the rotating force of the transferring roller 48, the recording medium 1 is returned into the accommodating area 12a of the housing section B.

At the point shown in FIG. 6, since the sliding member 38 and the feeding lever 41 are positioned at the rearward side, and the feeding lever 41 rotates counterclockwise, until the recording medium 1 is returned to the accommodating area 12a, the feeding piece 41b of the feeding lever 41 does not block the movement of the recording medium 1. When the recording medium 1 is returned to the accommodating area 12a by the transferring roller 48, the feeding and returning force applied from the transferring roller 48 to the recording medium 1 is terminated at the time that the rear end portion of the recording medium 1 separates from the transferring roller 48. Thereafter, when the driving lever 35 is returned in the X2 direction by the driving motor M2, the returning spring 42 returns the sliding member 38 and the feeding lever 41 in the X2 direction. At this time, due to the action of the guide 43, the feeding lever 41 is first rotated clockwise and the feeding piece 41b contacts the rear end portion of the recording medium 1, with the result that, due to the force of the returning spring 42, the recording medium 1 is fully pressed and returned into the accommodating area 12a.

As described above, while the driving lever 35 is returned in the X2 direction, the driving plate 55 returns in the X1 direction, and the holding member 81 returns to the original position as shown in FIGS. 3 and 8B. In the above-described embodiment, one guide shaft 84 provided in the holding member 81 is lifted by the lifting cam section 86, while the other guide shaft 85 is lifted by the rotating operation of the lifting arm 87. Although a movement stroke area in the X2 direction is necessary to lift the guide shaft by the lifting cam section 86, in the case of the structure where the guide shaft is lifted by the lifting arm 87, there is no need to provide a long movement stroke area for the driving plate 55 in the right-side region of the guide shaft 85 (as shown in FIG. 8A). Thus, as shown in FIGS. 8A and 8B, the driving plate 55 does not project to a great extent toward the right side of the loading section 61, and therefore it is possible to shorten the size of the system in the X1 and X2 directions. However, in the case that a large size is possible, it is also possible that the right-side guide shaft 85 is lifted by the lifting cam section 86 of the driving plate 55. Further, it is also possible that both the guide shafts 84 and 85 are lifted by the lifting arm 87.

In the above-mentioned embodiment, the recording medium 1 is made such that the mini-disk 1b is housed in the cartridge 1a and the holding member 81 moves vertically with respect to the loading base 62 with the turntable 63 and the positioning pin 65, and the recording medium 1 is loaded vertically on the loading base 62. However, in the case of a system using a recording medium which does not require the vertical loading, the holding member 81 can be moved only in the horizontal directions between the loading section 61 and the housing section B. Moreover, the recording medium 1 is not limited to the type that the mini-disk 1b is housed in the cartridge 1a, but this invention is also applicable to any plate-like medium type, for example, a compact disk, an optical recording medium such as a video disk, a magnetic recording medium such as a floppy disk, and a storage type recording medium such as a RAM card.

As described above, according to this invention, in a system where a recording medium is transferred toward the loading section by the transferring means having a roller and taken back from the loading section, when the recording medium is transferred in one of two directions and is held between the roller and the supporting shaft, the elastic biasing pressure applied to the recording medium by the roller is designed to be eliminated. Accordingly, the recording medium is insertable between the roller and the supporting member without any resistance. In addition, after the recording medium is placed between roller and the supporting member, elastic holding pressure is applied to the recording medium such that the recording medium is elastically held by the roller and the supporting member, and the rotating force of the roller is reliably applied as a feeding force to the recording medium. Further, in the case that the recording medium is fed into the holding member by the transferring means and then is drawn out from the transferring means, upon drawing the recording medium, the elastic biasing pressure by the roller and the supporting member is eliminated, and hence the resistance of the roller is not applied to the recording medium. This means that the recording medium can be reliably drawn out from the transferring means.

Moreover, the recording medium cartridge shutter is prevented from opening by mistake in such a manner that the roller has a short size such that it strikes only on a portion of the cartridge other than the shutter. In addition, the point of application of the biasing force is set to the center portion of the short roller, so that the roller does not incline and can reliably feed the recording medium. Still further, with the large diameter section and taper sections formed on the roller and the biasing force applied to only the large diameter section, the transferring force can reliably be applied from the roller to the recording medium. In addition, if means are provided for detecting the recording medium inserted between the roller and the supporting member, the biasing member adjusting mechanism is made operable when the recording medium is detected between the roller and the supporting member, with the result that the elastic holding force can reliably be applied to the recording medium and the elastic holding force can reliably be eliminated with respect to the recording medium, thus preventing malfunctions.

It should be understood that the foregoing relates only to presently preferred embodiments of the present invention, and that it is intended to cover all changes and modifications of the embodiments of the invention herein used for the purposes of the disclosure, which do not constitute departures from the spirit and scope of the invention.

What is claimed is:

1. A recording medium conveying system comprising:
   a loading section for receiving and reproducing information stored on a recording medium;
   a transferring mechanism for transferring the recording medium from a first position to the loading section, the transferring mechanism including:
   a roller which is driven to rotate in a first direction,
   a supporting member disposed parallel to the roller such that a gap is formed between the roller and the supporting member, and
   a biasing member which applies first and second biasing forces on one of the roller and the supporting member such that said one of the roller and the supporting member is biased toward the other of the roller and the supporting member; and
   an adjusting mechanism which adjusts the biasing member such that the first biasing force is applied to said one of the roller and the supporting member while the recording medium is moved from the first position and a first leading portion of the recording medium is inserted into the gap such that the roller and the supporting member engage the recording medium, and the second biasing force is applied after the first leading portion of the recording medium has reached a position where the recording medium has been engaged by the roller and the supporting member and moved toward the loading section by rotation of the roller in the first direction;

wherein the second biasing force is greater than the first biasing force.

2. The recording medium conveying system according to claim 1, wherein the transferring mechanism transfers the recording medium from the loading section to the first position by rotating the roller in a second direction, the recording medium conveying system further comprising:

a holding member positioned between the transferring mechanism and the loading section for moving the recording medium from the gap toward the loading section, and for moving the recording medium from the loading section to the gap;

wherein the adjusting mechanism adjusts the biasing member such that the first biasing force is applied while the recording medium is transferred from the holding member into the gap, and adjusts the biasing member such that the second biasing force is applied while the recording medium is engaged by the roller and the supporting member and is moved in the gap toward the first position by rotation of the roller in the second direction.

3. The recording medium conveying system according to claim 1, further comprising:

a holding member positioned between the transferring mechanism and the loading section for moving the recording medium from the gap to the loading section, and for moving the recording medium from the loading section to the gap;

wherein the holding member and the adjusting mechanism are synchronized such that the adjusting mechanism adjusts the biasing member from the first biasing force to the second biasing force after the recording medium is transferred from the holding member and has been engaged by the roller and the supporting member.

4. The recording medium conveying system according to claim 1, further comprising:

a housing section for storing the recording medium; and a feeding mechanism for moving the recording medium from the housing section into the gap;

wherein the feeding mechanism and the adjusting mechanism are synchronized such that the adjusting mechanism adjusts the biasing member from the first biasing force to the second biasing force after the feeding mechanism moves the recording medium from the housing section to the position where the recording medium has been engaged by the roller and the supporting member.

5. The recording medium conveying system according to claim 1, wherein the roller is biased by the biasing member toward the supporting member, wherein the gap between the roller and the supporting member is greater than a thickness of the recording medium when the adjusting mechanism applies the first biasing force, and wherein the gap between the roller and the supporting member is equal to or less than the thickness of the recording medium when the adjusting mechanism applies the second biasing force.

6. The recording medium conveying system according to claim 1, wherein the recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and wherein a point of application of the first or second biasing force applied by the biasing member for pressing the roller against the recording medium coincides approximately with a center position of the roller.

7. The recording medium conveying system according to claim 1, wherein the recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and further has a large-diameter portion and a taper portion whose diameter gradually decreases from the large-diameter portion along an axial direction of the roller, and wherein a point of application of the first or second biasing force applied by the biasing member for pressing the roller against the recording medium coincides with the large diameter portion of the roller.

8. The recording medium conveying system according to claim 1, further comprising means for detecting a presence of the recording medium in the gap between the roller and the supporting member, and for transmitting an output signal to the adjusting mechanism upon detection of the recording medium, wherein the adjusting mechanism applies the second biasing force in response to the output signal.

9. A recording medium conveying system comprising:

a loading section for receiving and reproducing information stored on a recording medium;

a transferring mechanism including:

a roller which is driven to rotate in a first direction for transferring the recording medium from a first position toward the loading section, and in a second direction for transferring the recording medium removed from the loading section to the first position, a supporting member disposed parallel to the roller such that a gap is formed between the roller and the supporting member, and a biasing member which applies first and second biasing forces on one of the roller and the supporting member such that said one of the roller and the supporting member such that said one of the roller and the supporting member is biased toward the other of the roller and the supporting member;

a holding member positioned between the transferring mechanism and the loading section for moving the recording medium from the gap to the loading section, and for moving the recording medium from the loading section to the gap; and an adjusting mechanism which adjusts the biasing member such that the first biasing force is applied to said one of the roller and the supporting member while the recording medium is moved from the first position and a first leading portion of the recording medium is inserted into the gap such that the roller and the supporting member engage the recording medium, and the second biasing force is applied after the first leading portion of the recording medium has reached a position where the recording medium has been engaged by the roller and the supporting member and moved toward the loading section by rotation of the roller in the first direction;

wherein the second biasing force is greater than the first biasing force.

10. The recording medium conveying system according to claim 9, wherein the holding member and the adjusting mechanism are synchronized such that the adjusting mechanism adjusts the biasing member from the first biasing force to the second biasing force after the recording medium is transferred from the holding member and has been engaged by the roller and the supporting member.

11. The recording medium conveying system according to claim 9, further comprising:

a housing section for storing the recording medium; and a feeding mechanism for moving the recording medium from the housing section into the gap;

wherein the feeding mechanism and the adjusting mechanism are synchronized such that the adjusting mechanism adjusts the biasing member from the first biasing force to the second biasing force after the feeding mechanism moves the recording medium from the housing section to the position where the recording medium has been engaged by the roller and the supporting member.

12. The recording medium conveying system according to claim 9, wherein the roller is biased by the biasing member toward the supporting member, wherein the gap between the roller and the supporting member is greater than a thickness of the recording medium when the adjusting mechanism applies the first biasing force, and wherein the gap between the roller and the supporting member is equal to or less than the thickness of the recording medium when the adjusting mechanism applies the second biasing force.

13. The recording medium conveying system according to claim 9, wherein the recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and wherein a point of application of the first or second biasing force applied by the biasing member for pressing the roller against the recording medium coincides approximately with a center position of the roller.

14. The recording medium conveying system according to claim 9, wherein the recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and further has a large-diameter portion and a taper portion whose diameter gradually decreases from the large-diameter portion along an axial direction of the roller, and wherein a point of application of the first or second biasing force applied by the biasing member for pressing the roller against the recording medium coincides with the large diameter portion of the roller.

15. The recording medium conveying system according to claim 9, further comprising means for detecting a presence of the recording medium in the gap between the roller and the supporting member, and for transmitting an output signal to the adjusting mechanism upon detection of the recording medium, wherein the adjusting mechanism applies the second biasing force in response to the output signal.

16. A recording medium conveying system comprising:

a housing section for storing a plurality of recording media;

a loading section for receiving a selected recording medium from the plurality of recording media, and for reproducing information stored on the selected recording medium;

a transferring mechanism for transferring the selected recording medium from a first position to the loading section, the transferring mechanism including:

a roller which is driven to rotate in a first direction, a supporting member disposed parallel to the roller such that a gap is formed between the roller and the supporting member, and a biasing member which applies first and second biasing force on one of the roller and the supporting member such that said one of the roller and the supporting member is biased toward the other of the roller and the supporting member; and an adjusting mechanism which adjusts the biasing member such that the first biasing force is applied to said one of the roller and the supporting member while the recording medium is moved from the first position and a first leading portion of the recording medium is inserted into the gap such that the roller and the supporting member engage the recording medium, and the second biasing force is applied after the first leading portion of the recording medium has reached a position where the recording medium has been engaged by the roller and the supporting member and moved toward the loading section by rotation of the roller in the first direction;

wherein the second biasing force is greater than the first biasing force.

17. The recording medium conveying system according to claim 16, wherein the transferring mechanism transfers the selected recording medium from the loading section to the first position by rotating the roller in a second direction, the selected recording medium conveying system further comprising:

a holding member positioned between the transferring mechanism and the loading section for moving the selected recording medium from the gap toward the loading section, and for moving the selected recording medium from the loading section to the gap;

wherein the adjusting mechanism adjusts the biasing member such that the first biasing force is applied while the selected recording medium is transferred from the holding member into the gap, and adjusts the biasing member such that the second biasing force is applied while the recording medium is engaged by the roller and the supporting member and is moved in the gap toward the first position by rotation of the roller in the second direction.

18. The selected recording medium conveying system according to claim 16, further comprising:

a holding member positioned between the transferring mechanism and the loading section for moving the selected recording medium from the gap to the loading section, and for moving the selected recording medium from the loading section to the gap;

wherein the holding member and the adjusting mechanism are synchronized such that the adjusting mechanism adjusts the biasing member from the first biasing force to the second biasing force after the selected recording medium is transferred from the holding member and has been engaged by the roller and the supporting member.

19. The recording medium conveying system according to claim 16, further comprising:

a feeding mechanism for moving the selected recording medium from the housing section to the transferring mechanism;

wherein the feeding mechanism and the adjusting mechanism are synchronized such that the biasing member is adjusted to exert the first biasing force until the selected recording medium is moved by the feeding mechanism to the position where the recording medium has been engaged by the roller and the supporting member.

20. The recording medium conveying system according to claim 16, wherein the roller is biased by the biasing member toward the supporting member, wherein the gap between the roller and the supporting member is greater than a thickness of the selected recording medium when the adjusting mechanism applies the first biasing force, and wherein the gap between the roller and the supporting member is equal to or less than the thickness of the selected recording medium when the adjusting mechanism applies the second biasing force.

21. The recording medium conveying system according to claim 16, wherein the selected recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and wherein a point of application of the first or second biasing force applied by the biasing member for pressing the roller against the selected recording medium coincides approximately with a center position of the roller.

22. The recording medium conveying system according to claim 16, wherein the selected recording medium includes a cartridge, a disk housed in the cartridge, and a shutter slidably mounted on the cartridge to expose a portion of the disk, wherein the roller has an axial length which is shorter than a width of the cartridge such that the roller contacts a portion of a surface of the cartridge other than the shutter, and further has a large-diameter portion and a taper portion whose diameter gradually decreases from the large-diameter portion along an axial direction of the roller, and wherein a point of application of the first or second biasing force applied by the biasing member for pressing the roller against the selected recording medium coincides with the large diameter portion of the roller.

23. The recording medium conveying system according to claim 16, further comprising means for detecting a presence of the selected recording medium in the gap between the roller and the supporting member, and for transmitting an output signal to the adjusting mechanism upon detection of the selected recording medium, wherein the adjusting mechanism applies the second biasing force in response to the output signal.

* * * * *